(12) United States Patent  (10) Patent No.: US 8,738,461 B1
Chu et al.  (45) Date of Patent: *May 27, 2014

(54) DISPLAY OF POPULAR, IN-STOCK PRODUCTS OF A MERCHANT

(71) Applicant: Google Inc., Mountain View, CA (US)

(72) Inventors: Christophe Francois Chu, San Francisco, CA (US); Paul Lee, Palo Alto, CA (US); Dan Moisa, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,882

(22) Filed: Mar. 18, 2013

Related U.S. Application Data

(63) Continuation of application No. 13/069,364, filed on Mar. 22, 2011, now Pat. No. 8,401,911.

(51) Int. Cl.
*G06Q 30/00* (2012.01)
*G06Q 20/00* (2012.01)

(52) U.S. Cl.
USPC ............................ 705/26.1; 705/14.51; 705/22

(58) Field of Classification Search
None
See application file for complete search history.

(56) References Cited

U.S. PATENT DOCUMENTS

| | | | |
|---|---|---|---|
| 7,027,999 | B2 | 4/2006 | Smith et al. |
| 7,720,723 | B2 | 5/2010 | Dicker et al. |
| 8,001,003 | B1 | 8/2011 | Robinson et al. |
| 8,044,809 | B2 | 10/2011 | Farmer |
| 8,121,905 | B2 | 2/2012 | Mohan |
| 8,195,526 | B2 | 6/2012 | Williams |
| 8,244,564 | B2 | 8/2012 | Selinger et al. |
| 8,335,722 | B2 | 12/2012 | Lee et al. |
| 8,392,261 | B2 | 3/2013 | Lee et al. |
| 8,401,911 | B1 | 3/2013 | Chu et al. |
| 2002/0147631 | A1 | 10/2002 | Smith et al. |
| 2003/0074349 | A1 | 4/2003 | Gupta et al. |
| 2003/0111531 | A1 | 6/2003 | Williams |
| 2006/0190348 | A1 | 8/2006 | Ofer et al. |
| 2006/0224439 | A1 | 10/2006 | Smith et al. |
| 2007/0150369 | A1 | 6/2007 | Zivin |
| 2008/0015953 | A1 | 1/2008 | Harper et al. |
| 2008/0249813 | A1 | 10/2008 | Schmeyer |
| 2011/0225033 | A1 | 9/2011 | Schmeyer et al. |
| 2011/0238665 | A1 | 9/2011 | Parikh et al. |
| 2012/0016757 | A1 | 1/2012 | Lee et al. |
| 2012/0016780 | A1 | 1/2012 | Lee et al. |
| 2012/0036038 | A1 | 2/2012 | Farmer |
| 2012/0284145 | A1 | 11/2012 | Kalin et al. |

OTHER PUBLICATIONS

Misiaszek, M., Final Office Action issued in co-pending U.S. Appl. No. 13/244,750, filed Sep. 26, 2011, pp. 1-11, Oct. 4, 2012.

(Continued)

*Primary Examiner* — Mussa A Shaawat
(74) *Attorney, Agent, or Firm* — Johnson, Marcou & Isaacs, LLC

(57) ABSTRACT

Displaying popular items that are available for sale at a merchant's physical location comprises creating a electronic document corresponding to the merchant's physical location. Then, a product availability database and a product popularity database are populated, the product availability database taking into account the inventory available at the merchant's physical location. Next, a cross-referencing engine identifies the popular products that are available at the merchant's physical location, and displays on the merchant's electronic document a plurality of popular items that are available at the merchant's physical location.

30 Claims, 19 Drawing Sheets

(56) References Cited

OTHER PUBLICATIONS

Misiaszek, M., Office Action issued in co-pending U.S. Appl. No. 13/244,750, filed Sep. 26, 2011, pp. 1-8, Mar. 9, 2012.

Shaawat, M. A., Office Action issued in co-pending U.S. Appl. No. 13/069,364, filed Mar. 22, 2011, pp. 1-11, Feb. 28, 2012.

Mahone, K., Office Action issued in copending U.S. Appl. No. 13/206,323, filed Aug. 9, 2011, pp. 1-11, Oct. 7, 2013.

| Database Type: | MySQL | ~ 602 |
| Database Host (:Port): | db_hostname | ~ 604 |
| Database Name: | retail_info | ~ 606 |
| DB Username: | user1 | ~ 608 |
| DB Password: | ****** | ~ 610 |

Remote Computer/Storage

| Remote Username: | remote_user1 | ~ 612 |
| Remote Password: | ****** | ~ 614 |
| Schedule Frequency: | Weekly | ~ 616 |
| Schedule Time: | 7:00 PM | ~ 618 |
| Schedule Day: | Saturday | ~ 619 |

Test Connections — 620
Save — 622
Clear — 624

DISPLAY OF POPULAR, IN-STOCK PRODUCTS OF A MERCHANT

This patent application is a continuation of and claims priority to U.S. patent application Ser. No. 13/069,364, filed Mar. 22, 2011 and entitled "Display of Popular, In-Stock Products of a Merchant." The entire contents of the above-identified application are hereby fully incorporated herein by reference.

TECHNICAL FIELD

The present disclosure relates generally to the display of products at an electronic document corresponding to a merchant's physical location, and more particularly to methods and systems for displaying popular products that are available for sale at the particular merchant location.

BACKGROUND

Computer networks, such as the Internet, enable transmission and reception of a vast array of information. In recent years, for example, some commercial retail stores have attempted to make product inventory information and other data related to product sales available to customers over the Internet. For simplicity, manufacturers, retailers, and others that sell products to customers are interchangeably referred to herein as "merchants." Where information is available, however, most of this information is stored in legacy systems, from which it is time consuming and expensive to obtain. As a result, much of the online information provided by individual retailers is inaccurate. Similarly, a number of third party businesses have attempted to organize local product information (for example, by scraping websites or other systems that expose product information, etc.) across multiple retailers and to provide the information over the Internet. These attempts have also not been successful, likely due to difficulties accessing reliable data with high coverage of products, retailers, and locations. In addition, where inventory data is obtained, it is often stale by the time it reaches the third party; thus, the inventory data may not be accurate.

Users researching a certain popular product often wish to find a nearby store or location that has the product for which they are looking in-stock. The term "in-stock," as used herein, refers to items that are currently in the merchant's inventory and are available for sale. The user may typically desire to determine whether the nearby merchant locations have the desired product in-stock. Therefore, it is desirable to provide a relevant portal or electronic document or place page that allows a customer or user to determine whether nearby merchants have in-stock a particular desired product.

SUMMARY

According to one aspect, a computer-implemented method for displaying popular items that are available for sale at a merchant's physical location may involve creating an electronic document or place page corresponding to the merchant's physical location. Reference will be made throughout this application to a place page, with the understanding that the place page is one embodiment of an electronic document according to the invention. The place page may contain certain information about the merchant, such as the phone number, the address, and a map to the merchant location. The place page also may contain images of and information regarding certain popular products that are available at the merchant's location. This product information can be created by reference to a product availability database and a product popularity database. The product availability database may be populated with information provided by the merchant, or otherwise obtained, taking into account the inventory available at the merchant's physical location. Next, a cross-referencing engine may identify the popular products that are available at the merchant's physical location, and display on the merchant's place page a plurality of popular items that are available at the merchant's physical location.

BRIEF DESCRIPTION OF THE DRAWINGS

FIG. 6 depicts a system for extracting data, in accordance with certain exemplary embodiments.

DETAILED DESCRIPTION OF EXEMPLARY EMBODIMENTS

Figure 1:
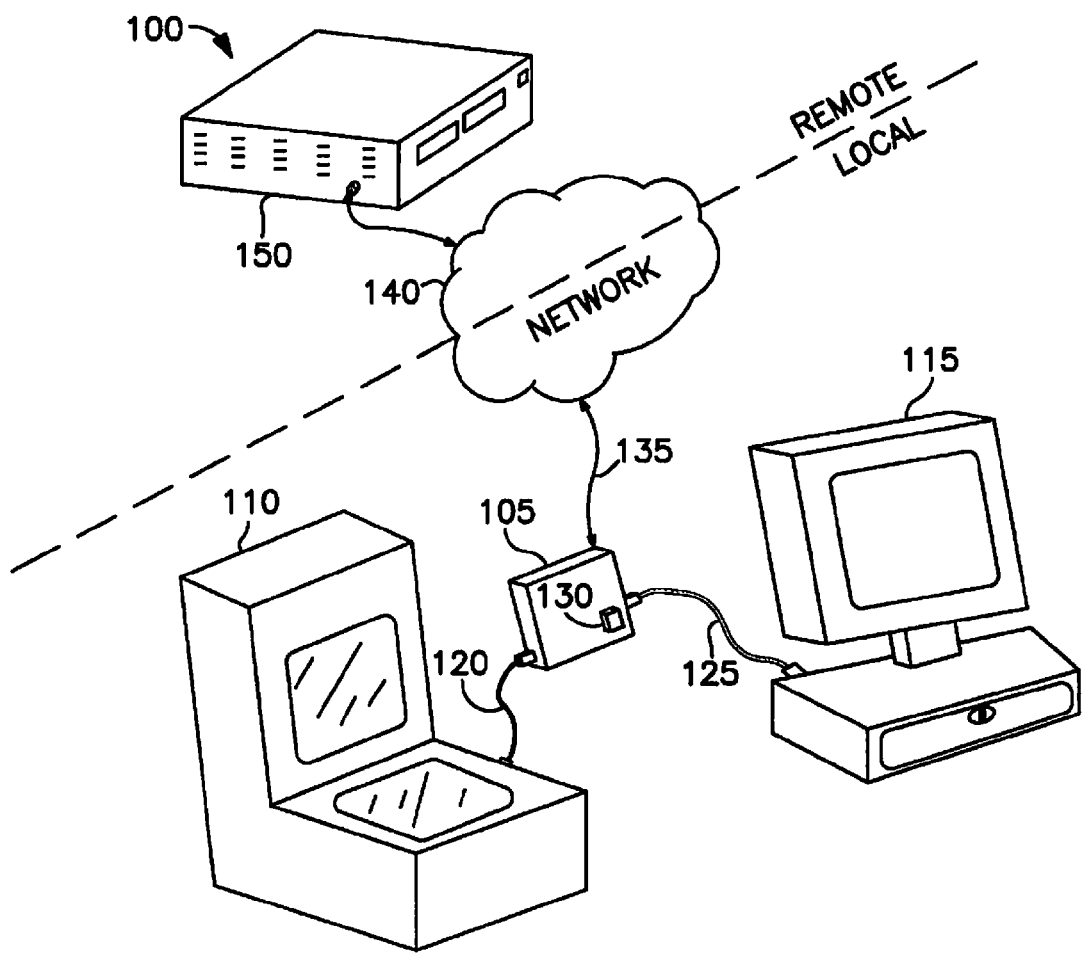
FIG. 1 depicts a system for collecting POS data, in accordance with certain exemplary embodiments.

The methods and systems described herein enable the accurate estimation of product availability and the collection of the world's local point of sale (POS) data and other information related to product sales and businesses that sell products.

According to certain exemplary embodiments, a POS data collection system can include a POS data collector that is implemented as a hardware device and/or in software. The adapter may be installed at the point of sale in retail stores, for example, between a barcode scanner and the POS application running on a POS terminal (for example, the cash register). When a product is scanned at the point of sale, the adapter may intercept the barcode as it is transmitted from the barcode scanner to the POS application. After intercepting the barcode, the adapter may transmit the barcode to the POS application without noticeable delay, so that the adapter does not interrupt standard business processes. In addition, the adapter may send the barcode to a remote server via a network connection. In this manner, the remote server may collect POS data that covers a significant number of products, retailers, and locations.

In the same or additional embodiments, a data collection system can include a content extractor that is implemented in software. The content extractor may be installed on a commercial retailer's local computer system, and may be used to extract information related to product sales and/or the commercial retailer itself. For example, many commercial retailers have local computer systems that store product inventory information, point of sale data, store listings (for example, businesses with more than one location), product listings (for example, all products for sale), price-quantity data (for example, per store, per product pricing), store maps, circulars, coupons, etc. This and other data related to product sales and the business that sells products may be stored in a commercial retailer's local computer system.

This data may be stored in a commercially available database format (for example, MySQL, Oracle, MS SQL Server, etc.) or according to other known methods (for example, product inventory/sales software, flat file, spreadsheet, etc.). According to certain exemplary embodiments, the content extractor may be used to easily and intuitively interface to the information stored in such a database (or other known format) so that the data may be extracted and sent to a remote computer via a network connection. For example, the content extractor may provide a user interface to easily and intuitively map existing database attributes to those expected by the remote computer, and to easily and intuitively schedule a one-time, periodic, and/or real-time transmission of the extracted data to the remote computer. In this manner, the remote computer may collect information that covers a significant number of products, retailers, and locations.

In the same or additional embodiments, a product availability estimation system may be implemented as part of a commercial retailer's computer system or as part of a third party computer system. The product availability estimation system may be used to estimate the availability of any given product that a commercial retailer offers for sale. Such product estimation may be based on any number of inputs, including, for example, POS data, periodic inventory feeds, bar code scans, global positioning system (GPS) data, receipt analysis (received from users or companies, such as optical character recognition of an image of a receipt), other "non-merchant" data, such as data from a third party aggregator, and other suitable information. According to an exemplary embodiment, the product availability estimation may be based on determining the velocity of sales events of a given product. In other exemplary embodiments, the product availability estimation may be based on determining the velocity of sales of a given product. Both of these exemplary embodiments may use the inputs described above, which may be available in real time (for example, as soon as possible taking network/communication/system latency into account) or on a periodic basis (for example, batch updates from the retailer scheduled every hour, every eight hours, once a day, or other suitable time period). According to exemplary embodiments, the product availability estimation system may provide an availability estimate to a potential purchaser, for example, when a potential purchaser conducts an Internet search for a product.

In the same or additional embodiments, items that are available for sale at a merchant's physical location are displayed to an end user. A place page corresponding to the merchant's physical location is created. The place page may contain certain information about the merchant, such as the phone number, the address, and a map to the merchant location. The place page also may contain images of and information regarding certain popular products that are available at the merchant's location. This product information can be created by reference to a product availability database and a product popularity database. The product availability database may be populated with information provided by the merchant, or otherwise obtained, taking into account the inventory available at the merchant's physical location. The product inventory can be provided or estimated as described herein. Next, popular products that are available at the merchant's physical location are identified and displayed on the merchant's place page.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

FIG. 1 depicts a system 100 for collecting POS data, in accordance with certain exemplary embodiments. As depicted in FIG. 1, system 100 may comprise POS data collector 105, POS scanner 110, POS terminal 115, and remote system 150. POS data collector 105 may be connected to POS scanner 110 via connection 120, and to POS terminal 115 via connection 125. POS data collector 105 may communicate with POS scanner 110 and POS terminal 115 using any standard or proprietary storage and/or communication protocol, including without limitation, universal serial bus (USB), RS-232, and/or any combination thereof. And while the embodiment in FIG. 1 depicts wired connections 120 and 125, either or both of these connections may be replaced with a wireless communication link (for example, Wi-Fi, MiFi, Bluetooth, etc.) in accordance with certain other exemplary embodiments. Additionally, while POS data collector 105 is depicted as a standalone hardware device in FIGS. 1 and 2, one or more components of POS data collector 105 may be integrated into one or both of POS scanner 110 and POS terminal 115, in accordance with alternative exemplary embodiments.

Figure 2:
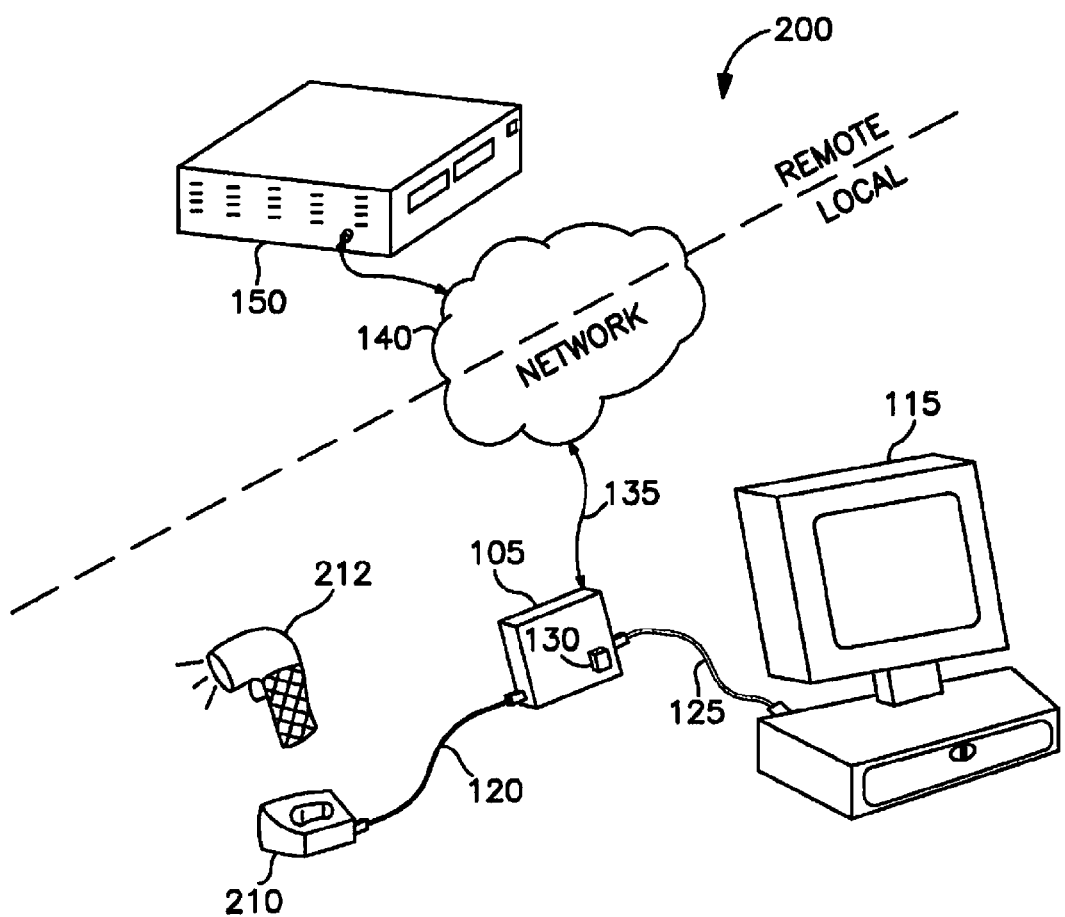
FIG. 2 depicts a system for collecting POS data, in accordance with certain exemplary embodiments.

As depicted in FIG. 1, the POS scanner 110 may be a traditional wired, generally stationary barcode scanner, in accordance with certain exemplary embodiments. FIG. 2 depicts system 200 according to an alternative embodiment wherein POS scanner includes POS wireless barcode scanner 212 and POS wireless base station 210. In this alternative embodiment, POS data collector 105 may communicate with POS wireless base station 210 in the same way the POS data collector 105 communicates with POS scanner 110 of FIG. 1. While FIGS. 1 and 2 illustrate different exemplary embodiments, it should be appreciated that the POS data collector 105 may be used similarly in POS systems with hardware that varies from that depicted in FIGS. 1 and 2.

According to an exemplary embodiment, POS scanner 110 may be a barcode scanner and may be configured to read any number of barcode formats, including without limitation UPC, EAN, JAN, etc. According to other exemplary embodiments, POS scanner 110 may be an RFID reader or any other device that is capable of reading product identifier information in a POS system.

As further depicted in FIG. 1, POS data collector 105 may be communicatively coupled to remote system 150 via network 140. Network 140 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). POS data collector 105 may connect to network 140 via connection 135. According to an exemplary embodiment, connection 135 may be a dedicated cellular modem connection. In an alternative embodiment, connection 135 may be a wired Ethernet connection, a Wi-Fi or Bluetooth connection to a hotspot that has a wired/wireless Internet connection (for example, MiFi), or any other wired or wireless connection suitable for communicating signals with network 140.

Figure 3:
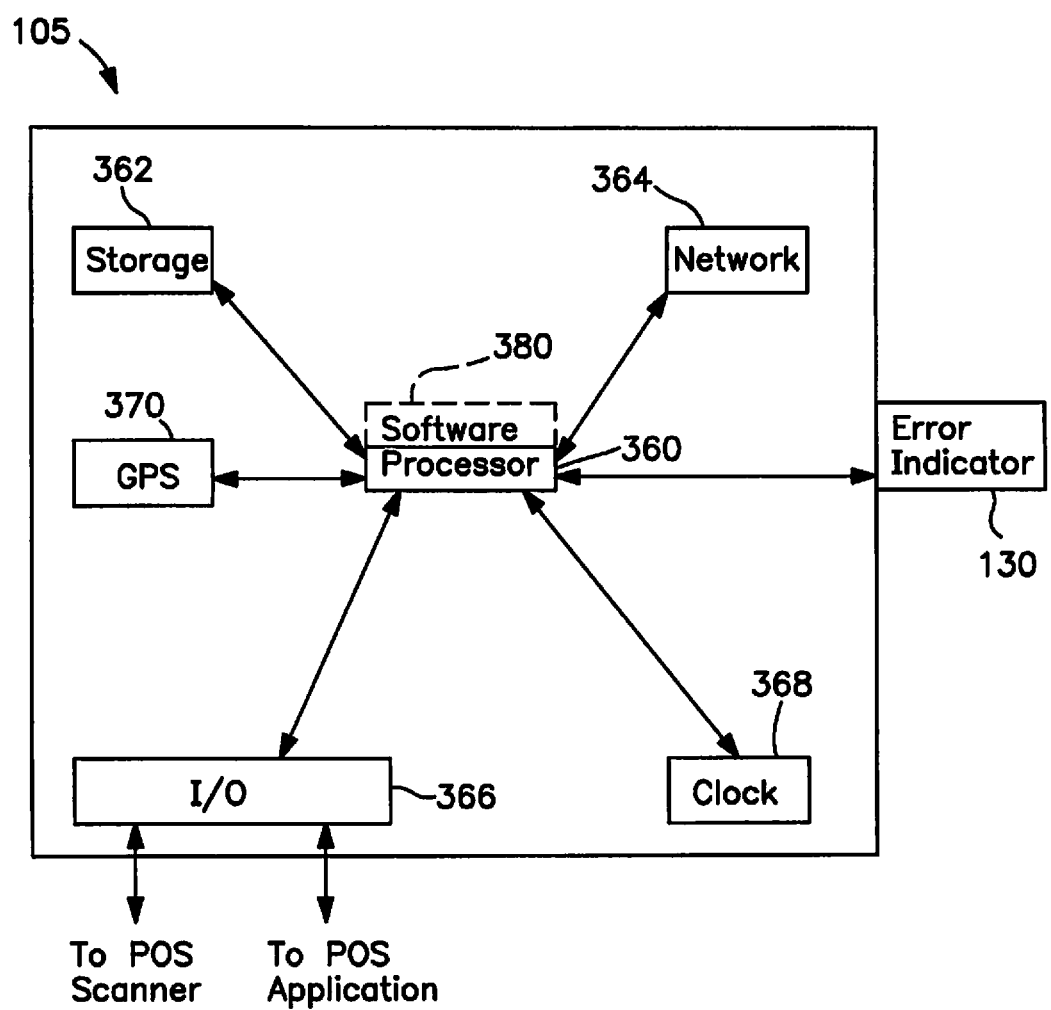
FIG. 3 depicts a block diagram of POS data collector, in accordance with certain exemplary embodiments.

FIG. 3 depicts a block diagram of POS data collector 105, in accordance with certain exemplary embodiments. Components of POS data collector 105 may include, but are not limited to, processor 360, storage resource 362, network module 364, input/output (I/O) module 366, clock module 368, GPS module 370, and error indicator 130 (error indicator 130 is also depicted in FIGS. 1 and 2). As depicted processor 360 may be communicatively coupled to each of the other components of POS data collector 105.

Processor 360 may comprise any system, device, or apparatus operable to interpret and/or execute program instructions and/or process data associated with software module 380, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 360 may interpret and/or execute program instructions and/or process data stored locally (for example, in storage resource 362). In the same or alternative embodiments, processor 360 may interpret and/or execute program instructions and/or process data stored remotely (for example, in a network storage resource (not depicted) of network 140 of FIGS. 1 and 2).

Local storage resource 362 may comprise computer-readable media (for example, hard disk drive, floppy disk drive, CD-ROM, and/or other type of rotating storage media, flash memory, EEPROM, and/or other type of solid state storage media) and may be generally operable to store data.

Network module 364 may be any suitable system, apparatus, or device operable to serve as an interface between information POS data collector 105 and network 140 (FIGS. 1 and 2). Network module 364 may enable information POS data collector 105 to communicate over network 140 using any suitable transmission protocol and/or standard, including without limitation all transmission protocols and/or standards enumerated above with respect to the discussion of network 140 and connection 135.

I/O module 366 may be any system, device, or apparatus generally operable to receive and/or transmit data to/from/within information POS data collector 105. I/O module 366 may comprise, for example, any number of communication interfaces, including without limitation a USB interface and/or an RS-232 interface.

Clock module 368 may be any system, device, or apparatus generally operable to maintain an internal clock. According to certain exemplary embodiments, clock module 368 may synchronize with the UTC (coordinated universal time). Additionally, clock module 368 may be configured to maintain an accurate internal clock when power to POS data collector 105 is removed (for example, via an independent battery power source).

GPS module 370 may be any system, device, or apparatus generally operable to determine and provide the location of POS data collector 105 based on global positioning satellite signals or other similar methods (for example, via location information received by network module 364).

Error indicator 130 may be any system, device, or apparatus generally operable to provide an indication that may be detected visually or audibly by a person near POS data collector 105. For example, error indicator 130 may be a visible LED light, in accordance with certain exemplary embodiments. In the same or alternative embodiments, error indicator may be an audible speaker capable of producing an audible noise.

Figure 4:
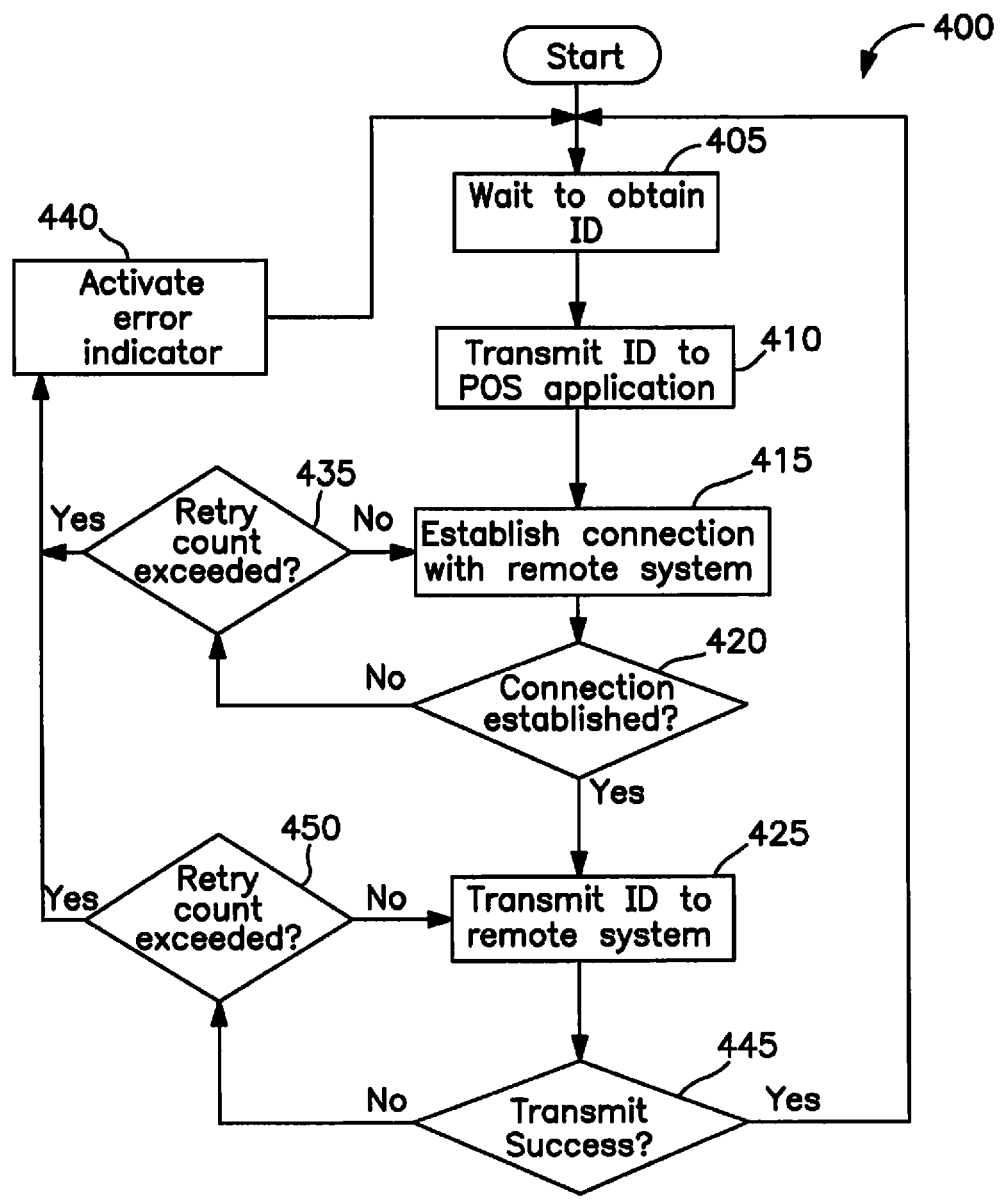
FIG. 4 is a block flow diagram depicting a method for collecting POS data, in accordance with certain exemplary embodiments.

FIG. 4 is a block flow diagram depicting a method 400 for collecting POS data, in accordance with certain exemplary embodiments. The method 400 is described with reference to components illustrated in FIGS. 1-3.

In block 405, a software module 380 of a POS data collector 105 may wait to obtain a product identifier associated with a product that is being purchased. For example, POS scanner 110 is used to scan the barcode of a product that is being purchased. After scanning, the POS scanner 110 transmits the product identifier for processing by a POS application running on POS terminal 115. Because the POS data collector 105 is communicatively coupled between POS scanner 110 and POS terminal 115, POS data collector 105 may obtain the product identifier associated with the purchased product as the identifier is transmitted to the POS terminal 115.

In block 410, software module 380 may transmit an unmodified version of the product identifier to POS terminal 115. In accordance with certain exemplary embodiments, this transmission may be performed without noticeable delay so that the addition of POS data collector 105 to POS system 100 docs not interfere with the normal business flow. In other words, the POS application running on POS terminal 115 will be able to proceed with the purchase transaction, and will not be noticeably delayed by the addition of the POS data collector 105 to POS system 100.

In block 415, the software module 380 may establish a connection with remote system 150 via network module 364 and network 140. According to an exemplary embodiment, software module 380 may establish this connection by resolving the host name and/or address via DNS or other protocols, and subsequently communicating with remote system 150 to establish the connection. If a connection is successfully established (block 420), software module 380 may proceed to block 425 and may transmit the product identifier to remote host 150. According to certain exemplary embodiments, this transmission may be via the HTTPS protocol, or any other protocol suitable for communicating data over network 140 to remote system 150. According to exemplary embodiments that utilize the HTTPS protocol, software module 380 may verify the validity of the SSL certificate, and may not transmit data if validity is not established.

According to an exemplary embodiment, the data transmission in block 425 may include only the product identifier. In other embodiments, software module 380 may transmit additional data to remote server 150. In both cases, and according to the HTTPS protocol used in an exemplary embodiment, the transmitted data may be sent as a body of a POST request over HTTPS. Thus, when only the product identifier is transmitted, the body of the POST request may contain the following fields:

scan:<product_identifier>

In an alternative embodiment, software module 380 may provide additional data including, but not limited to, one or more of the following: a merchant identifier, a store identifier (for example, for merchants with more than one store), a scanned product count, a current time stamp, a device identifier (for example, a manufacturer-issued serial number), a security key (for example, for secure communication), a software version number, price, and a device GPS coordinate. In accordance with this alternative embodiment, the body of the POST request may contain one or more of the following fields:

serial:<device_identifier>
key:<security key>
version:<software version>
currenttime:<current_time>
sequence:<scanned_product_count>
store:<store_identifier>
gps:<gps_coordinates>
scan:<product_identifier>

In yet another exemplary embodiment, software module 380 may provide a time stamp indicating when the product identifier was scanned by the POS scanner. According to this embodiment, the body of the POST requests depicted above may be modified as follows:

scan:<product_identifier>:<timestamp>

In block 445, software module 380 may determine if the transmission was successful. For example, according to a transmission via HTTPS, software module 380 may receive a HTTP 200/OK response with an empty body when the transmission is successful. Alternatively, software module 380 may receive either a 4xx or 5xx HTTP error if the transmission is unsuccessful.

If the data transmission is not successful (block 445), software module 380 may proceed to block 450, where it may determine if a predetermined retry count has been exceeded. If the retry count has not been exceeded, software module 380 may increment the retry count and proceed back to block 425 where it may again attempt to transmit the product identifier (and any other data, as described above) to remote system 150. According to an exemplary embodiment, software module 380 may proceed to block 425 immediately. In other embodiments, software module 380 may wait for a predetermined amount of time (for example, 1, 5, 10, etc. minutes) before retrying the transmission. In yet another exemplary embodiment, software module 380 may wait for 1 minute before retrying (the "timeout interval"), and if the next attempted transmission is unsuccessful, double the timeout interval. In this embodiment, software module 380 may continue to double the timeout interval for each consecutive failed transmission attempt until the timeout interval is 32 minutes, at which point software module 380 may keep trying to transmit the data every 32 minutes.

In the event the number of transmission attempts exceeds the predetermined retry count in block 450, software module may proceed to block 440, and may activate error indicator 130. In this manner, an employee of the retail store may be notified that the POS data collector has encountered an error.

Similarly, if a connection is not successfully established (block 420), software module 380 may proceed to block 435, where it may determine if a predetermined retry count has been exceeded. If the retry count has not been exceeded, software module 380 may increment the retry count and proceed back to block 415 where it may again attempt to establish a connection with remote system 150. Here, a timeout interval algorithm similar to that described above may be used. In the event the number of connection attempts exceeds the predetermined retry count in block 435, software module may proceed to block 440, and may activate error indicator 130. In this manner, an employee of the retail store may be notified that the POS data collector has encountered an error.

In the event the error indicator is activated, software module 380 may proceed back to block 405, where it may wait to obtain the next product identifier associated with an additional product that is being purchased. Thus, software module 380 may continue to operate despite the error condition. In this manner, the POS data collector 105 may at least continue to transmit scanned product identifiers to the POS terminal (block 410) so that the error condition does not interfere with business operations. According to an exemplary embodiment (not depicted), software module 380 may, in such a case, deactivate the error indicator if a subsequent attempt to establish a connection with remote system 150 or to transmit data to remote system 150 is successful.

Thus, according to the exemplary embodiment of FIG. 4, POS data collector 105 may transmit each product identifier essentially in real time as each product is scanned and without significant delay (i.e., no more delay than is necessary for the method steps of FIG. 4 to be performed).

According to an exemplary embodiment and as an alternative to transmitting POS data in real time, POS data collector 105 may accumulate POS data and transmit the accumulated data to remote system 150 periodically. For example, software module 380 may store accumulated product identifiers in storage resource 362 until such time as they are transmitted to remote system 150. In one embodiment, for example, software module 380 may accumulate product identifiers for a predetermined amount of time (for example, 5, 15, 30, etc. minutes) before transmitting the data to remote server 150. In yet another embodiment, software module 380 may accumulate product identifiers and may transmit the data to remote server 150 after a predetermined number of identifiers (for example, 5, 100, 1000, etc.) have been accumulated.

In still a further embodiment, software module 380 may accumulate POS data and use both a time period and a predetermined product identifier count to determine when to transmit the data to remote system 150. According to this exemplary embodiment, software module 380 may buffer product identifiers for a predetermined amount of time or until a predetermined number of product identifiers are accumulated—whichever comes first. In still another embodiment, software module 380 may accumulate POS data until a predetermined amount of data is accumulated (for example, 1 kB, 1 MB, etc.). Accordingly, the data transmission may be optimized to minimize traffic while still sending updates with reasonable frequency.

Thus, software module 380 may transmit only the accumulated product identifiers, in accordance with an exemplary embodiment. In such a case, the body of an HTTPS request may be formatted as follows:

scan:<product_identifier>:<timestamp>
    scan:<product_identifier>:<timestamp>
    ...

In embodiments where the software module 380 provides data in addition to the product identifiers, the body of the POST request may contain one or more of the following fields:

serial:<device_identifier>
    key:<security key>
    version:<software version>
    currenttime:<current_time>
    sequence:<scanned_product_count>
    store:<store_identifier>
    gps:<gps_coordinates>
    scan:<product_identifier>:<timestamp>
    scan:<product_identifier>:<timestamp>
    ...

In the exemplary embodiments described above, the connection to remote system 150 via network module 364 and network 140 may be kept open or may be closed between transmissions.

POS data collector 105 may transmit an alive indicator to remote system 150, in accordance with an exemplary embodiment. For example, regardless of whether any products are scanned, software module 380 may send an alive indicator to remote system 150 on a periodic basis (for example, every 4, 6, 8, etc. hours). Software module 380 may transmit an alive indicator using steps similar to those described in FIG. 4. For example, software module 380 may perform the same retry/error algorithm when attempting to establish a connection with remote system 150 and to transmit the alive indicator.

According to exemplary embodiments that utilize the HTTPS protocol for transmission, the HTTPS transmission for an alive indicator may be directed to a URL that is different from the URL used for transmitting product identifier(s). In addition, the body of an alive indicator POST request may contain one or more of the following fields:

serial:<device_identifier>
    key:<security key>
    version:<software version>
    currenttime:<current_time>
    sequence:<scanned_product_count>

Accordingly, remote system 150 may use the alive indicator transmission to monitor POS data collector 105 for errors. In other words, remote system 150 may determine that POS data collector 105 is not operating if it does not receive an alive indicator according to the predetermined periodic schedule. Thus, a POS data collection system provider can arrange to troubleshoot POS data collector 105 in the event it stops operating correctly.

Figure 5:
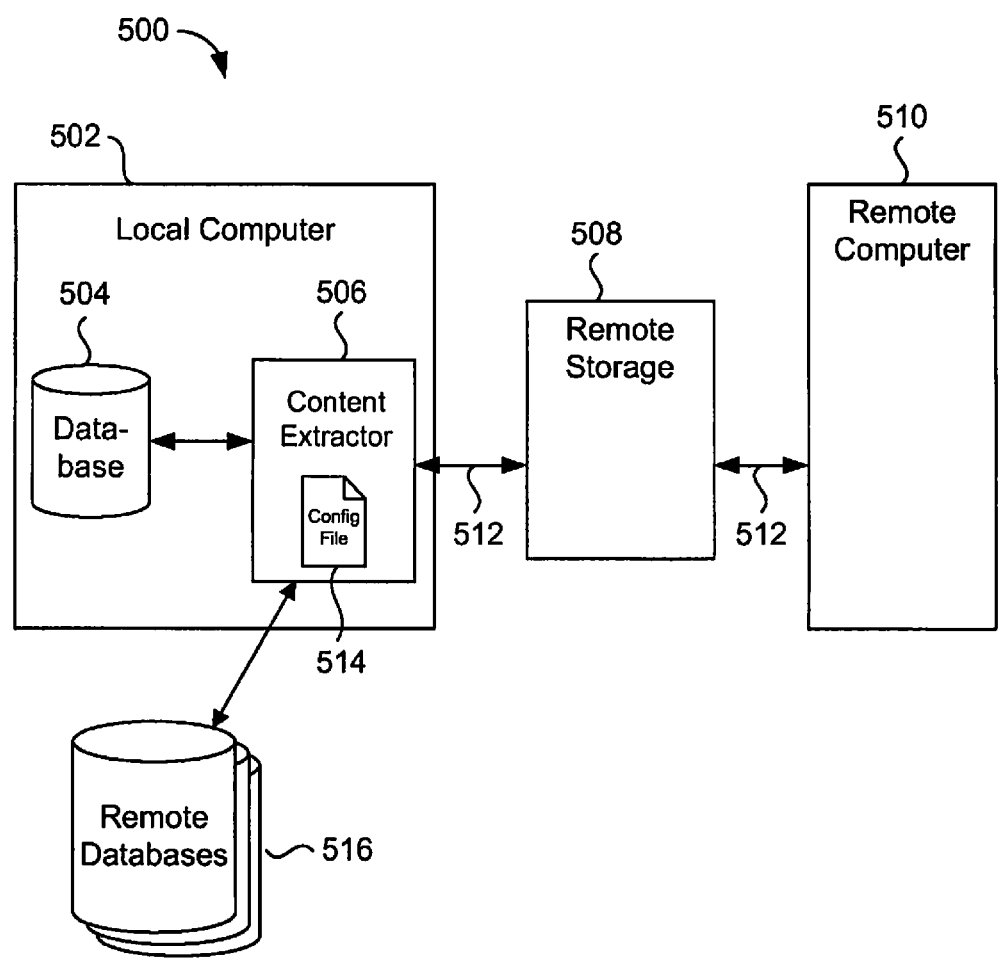
FIG. 5 depicts a system for extracting data, in accordance with certain exemplary embodiments.

FIG. 5 depicts a system 500 for extracting data, in accordance with certain exemplary embodiments. As depicted in FIG. 5, system 500 may comprise local computer 502, remote storage resource 508, remote computer 510, and remote databases 516. Local computer 502 may be a commercial retailer's central server located at the retailer's headquarters, or it may be a regional server, or a store-specific server. Database 504 may reside on local computer 502 or may reside on a remote database server (not pictured), and may contain data related to retail products and/or the business that sells products. For example, local computer 502 may be owned by a commercial retailer and database 504 may contain data related to the retailer's product inventory, the retailer's stores (for example, businesses with more than one location), point of sale transactions, product listings, price-quantity data (for example, per store, per product pricing), circulars, coupons, etc. According to exemplary embodiments, database 504 may be a commercially available database program (for example, MySQL, Oracle, MS SQL Server, etc.). In alternative embodiments, database 504 may be part of commercially available product inventory/sales software, a flat data file, a spreadsheet, etc. Similarly, remote databases 516 may be of any type, but may be located remote to local computer 502.

According to exemplary embodiments, content extractor 506 may reside on local computer 512. Content extractor may be software that is generally operable to extract data from database 504, to process the extracted data, and to transmit data to remote storage 508 and/or remote computer 510. As illustrated, content extractor 506 may include a configuration file 514. Configuration file 514 may be any format, including binary, clear text, database, or other suitable format. Configuration file 514 may contain connection and mapping settings related to database 504, remote storage 508 and/or remote computer 510. Content extractor 506 and configuration file 514 are explained in detail with reference to FIGS. 6-8, below.

Remote storage 508 may be any storage facility accessible to both local computer 502 and remote computer 510. According to exemplary embodiments, remote storage 508 may include disk-based storage resources, such as magnetic storage, opto-magnetic storage, or any other type of disk-based storage. As depicted in FIG. 5, remote storage may be separate from local computer 502 and remote computer 510, for example, as a stand-alone network attached storage solution, as a cloud storage solution, etc. Alternatively, remote storage 508 may form an integral part of remote computer 510, for example, as a storage resource (or array of storage resources) residing on remote computer 510.

Remote computer 510 may be any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, remote computer 510 may be a mainframe computer, a network server, a personal computer, a PDA, a consumer electronic device, a network storage device, or any other suitable device and may vary in size, shape, performance, functionality, and price. Remote computer 510 may include memory, one or more processing resources such as a central processing unit (CPU) or hardware or software control logic. Additional components or the remote computer 510 may include one or more storage devices, one or more communications ports for communicating with external devices as well as various input and output (I/O) devices, such as a keyboard, a mouse, and a video display. The remote computer 510 may also include one or more buses operable to transmit communication between the various hardware components.

As further depicted in FIG. 5, local computer 502 may be communicatively coupled to remote storage 508 (if provided) and remote computer 510 via network 512. Network 512 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). According to an exemplary embodiment, local computer 502 may connect to network 512 via a dedicated cellular modem connection. In an alternative embodiment, local computer 502 may connect to network 512 via a wired Ethernet connection, a Wi-Fi or Bluetooth connection to a hotspot that has a wired/wireless Internet connection (for example, MiFi), or any other wired or wireless connection suitable for communicating signals over network 512.

FIG. 6 depicts a system 600 for extracting data, in accordance with certain exemplary embodiments. As depicted in FIG. 6, system 600 may include configuration dialogue 601. Configuration dialogue 601 may be presented by content extractor 506 to a user of local computer 502, and may be generally operable to accept input from the user. For example, configuration dialogue 601 may include a Database Type menu 602. According to certain exemplary embodiments, Database Type menu 602 may be a drop-down menu with a preconfigured selection of database types that are compatible with content extractor 506. For example, the Database Type menu 602 may contain entries for commercially available database programs (for example, MySQL, Oracle, MS SQL Server, etc.), commercially available product inventory/sales software (for example, POSlog, etc.), flat data files, spreadsheets, etc. Accordingly, a user of local computer 502 may select the appropriate entry in Database Type menu 602 that corresponds to database 504.

According to certain exemplary embodiments, configuration dialogue 601 may also include Database Host input 604 (with optional port number), Database Name input 606, DB Username input 608, and DB Password input 610. Accordingly, a user of local computer 502 may specify the connection parameters specific to database 504 so that content extractor 506 may obtain access to the data contained therein. While inputs 602-610 are explicitly depicted in FIG. 6, configuration dialogue 601 should not be limited to this specific embodiment. For example, additional inputs may be provided related to accessing database 504. Alternatively, some of the depicted inputs may not be necessary to access database 504 depending on the specific configuration of local computer 502 and database 504.

In addition to the database configuration parameters just described, configuration dialogue 601 may accept remote computer and/or remote storage configuration parameters. For example, in some embodiments, configuration dialogue 601 may include Remote Username input 612, Remote Password input 614, Schedule Frequency menu 616, Schedule Time input 618, and Schedule Day menu 619. According to certain exemplary embodiments, Schedule Frequency menu 616 may be a drop-down menu with a preconfigured selection of frequency types that are compatible with content extractor 506.

According to the depicted embodiment, Schedule Frequency menu 616 includes the "weekly" frequency type, indicating that content extractor 506 should extract data from database 504 and transmit the data to remote storage 508 and/or remote computer 510 on a weekly basis, for example, at 7:00 PM every Saturday (as specified by Schedule Time input 618 and Schedule Day menu 619). In other exemplary embodiments, Schedule Frequency menu 616 may contain entries for other periodic extraction frequencies, such as "monthly," "daily," "hourly," etc.

In still another embodiment, Schedule Frequency menu 616 may contain an entry for "instant" or "manual" extraction. According to these embodiments, content extractor 506 may extract data from database 504 and transmit the data to remote storage 508 and/or remote computer 510 as soon as the user clicks Save button 622.

According to yet another exemplary embodiment, Schedule Frequency menu 616 may contain an entry for "real time" extraction. According to this embodiment, content extractor 506 may extract data from database 504 and transmit the data to remote storage 508 and/or remote computer 510 in real time. For example, real time extraction may occur in response to the updating of a database table in database 504. This may be useful, for example, to reflect a change of product pricing, a store closing, a promotion, a regional event, product sales (for example, line item data reflecting recent sale information), or other change related to product sales and/or the business or store that sells the products. In other exemplary embodiments, real time extraction may occur in response to other predetermined events that are external to database 504 (for example, local computer establishing connection with remote storage 508 and/or remote computer 510, content extractor establishing connection to database 504, etc.). These and other events that trigger real time extraction may be provided for in configuration file 514.

Thus, by providing parameters 612-619, a user of local computer 502 may specify the connection parameters specific to remote storage 508 and/or remote computer 510 so that content extractor 506 may connect and transmit data thereto. While inputs 612-619 are explicitly depicted in FIG. 6, configuration dialogue 601 should not be limited to this specific embodiment. For example, additional inputs may be provided related to accessing remote storage 508 and/or remote computer 510. Alternatively, some of the depicted inputs may not be necessary to access remote storage 508 and/or remote computer 510 depending on the specific configuration of local computer 502, remote storage 508, and remote computer 510.

According to exemplary embodiments, configuration dialogue 601 may include Test Connections button 620, Save button 622, and Clear button 624, which may provide the function indicated by each respective label. For example, Test Connections button 620 may use the user-supplied input parameters to test for a valid connection to the database 504, remote storage 508, and/or remote computer 510. Save button 622 may save the user-supplied input parameters to configuration file 514. Clear button 624 may clear all user-supplied input so that the input fields are blank and/or non-selected.

Figure 7:
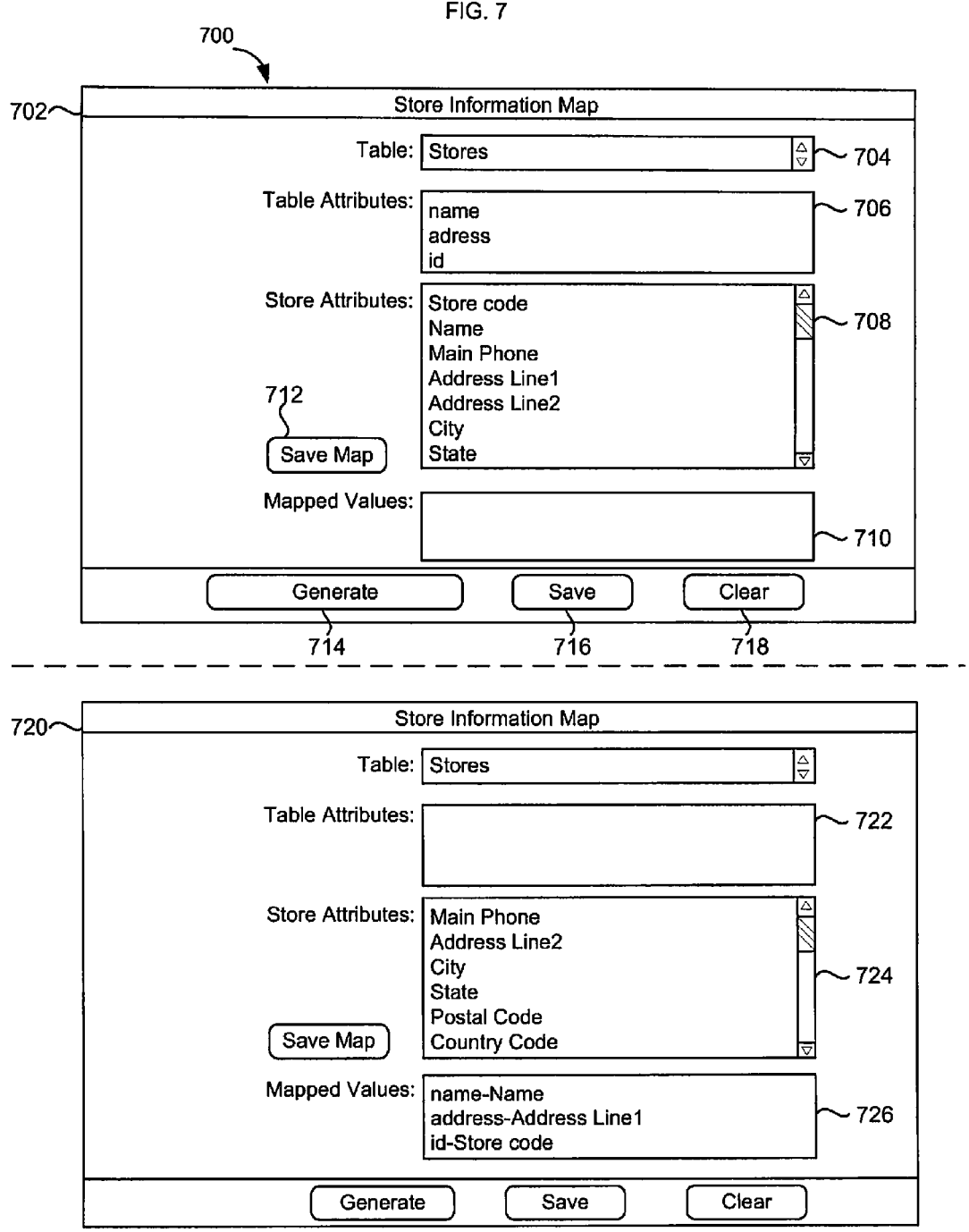
FIG. 7 depicts a system for extracting data, in accordance with certain exemplary embodiments.

FIG. 7 depicts a system 700 for extracting data, in accordance with certain exemplary embodiments. As depicted in FIG. 7, system 700 may include table mapping dialogue 702. Table mapping dialogue 702 may be presented by content extractor 506 to a user of local computer 502, and may be generally operable to accept input from the user, where the input aids in mapping table attributes (for example, table fields) in database 504 to predefined attributes in content extractor 506. In certain exemplary embodiments, table mapping dialogue 702 may be specific to a certain type of information, or table. For example FIG. 7 depicts a table mapping dialogue 702 that is specific to store information. According to this embodiment, the user may provide a mapping of table attributes related to store information (for example, for a retailer with one or multiple stores). In other exemplary embodiments, table mapping dialogue 702 may be specific to product information (for example, data related to all products that a specific retailer sells). In still other exemplary embodiments, table mapping dialogue 702 may be specific to price-quantity information (for example, per store, per product inventory and pricing information). Still other embodiments of table mapping dialogue 702 may be provided, such that other data related to product sales and businesses that sell products may be collected.

According to certain exemplary embodiments, table mapping dialogue 702 may contain Table menu 704 of a drop-down menu type. The entries available on Table menu 704 may be provided based on the tables available in database 504 using connection parameters stored in configuration file 514. When the user selects a table using Table menu 704, the attributes of the selected table may appear in Table Attributes field 706. In the depicted example, selected table "stores" has three attributes: name, address, and id. Table mapping dialogue 702 may also contain Store Attributes field 708. Store Attributes field 708 may contain predefined attributes of content extractor 506. In this depicted embodiment, this field is labeled "Store Attributes" because, as discussed above, the table mapping dialogue 702 is specific to Store Information. In other embodiments, this field of table mapping dialogue 702 may have a different label (for example, "Product Attributes," "Price-Quantity Attributes," etc.).

Accordingly, a user of local computer 502 may provide a mapping between the table attributes (shown in Table Attributes field 706) and the predefined attributes of content extractor 506 (shown, for example, in Store Attributes field 708). For example, a user may select "name" from Table Attributes field 706 and "Name" from Store Attributes field 708 and press Save Map button 712. In the same manner, a user may map "address" to "Address Line 1," and "id" to "Store Code." The result of this example mapping is depicted in table mapping dialogue 720 of FIG. 7. Specifically, the mapping may be presented to the user in the manner depicted in Mapped Values field 726. According to exemplary embodiments and as depicted in mapping dialogue 720, once a table attribute is mapped, it may be removed from Table Attributes field 706. Likewise, once a store attribute is mapped, it may be removed from Store Attributes field 706.

According to exemplary embodiments, table mapping dialogue 702 may include Generate button 714, Save button 716, and Clear button 718, which may provide the function indicated by each respective label. For example, Generate button 714 may use the user-supplied input parameters to generate a file representing the data that content extractor 506 would transmit to remote storage 508 and/or remote computer 510. This may be useful, for example, to ensure that the user-supplied mapping is accurate. Save button 716 may save the user-supplied input parameters to configuration file 514 or a separate mapping file (not depicted). Clear button 624 may clear all user-supplied input so that the input fields are blank and/or revert to their initial state.

According to the features of the exemplary embodiments described above, a user of local computer 502 may easily provide a mapping of table attributes in existing, legacy database systems to the predefined attributes desired by content extractor 506.

Figure 8:
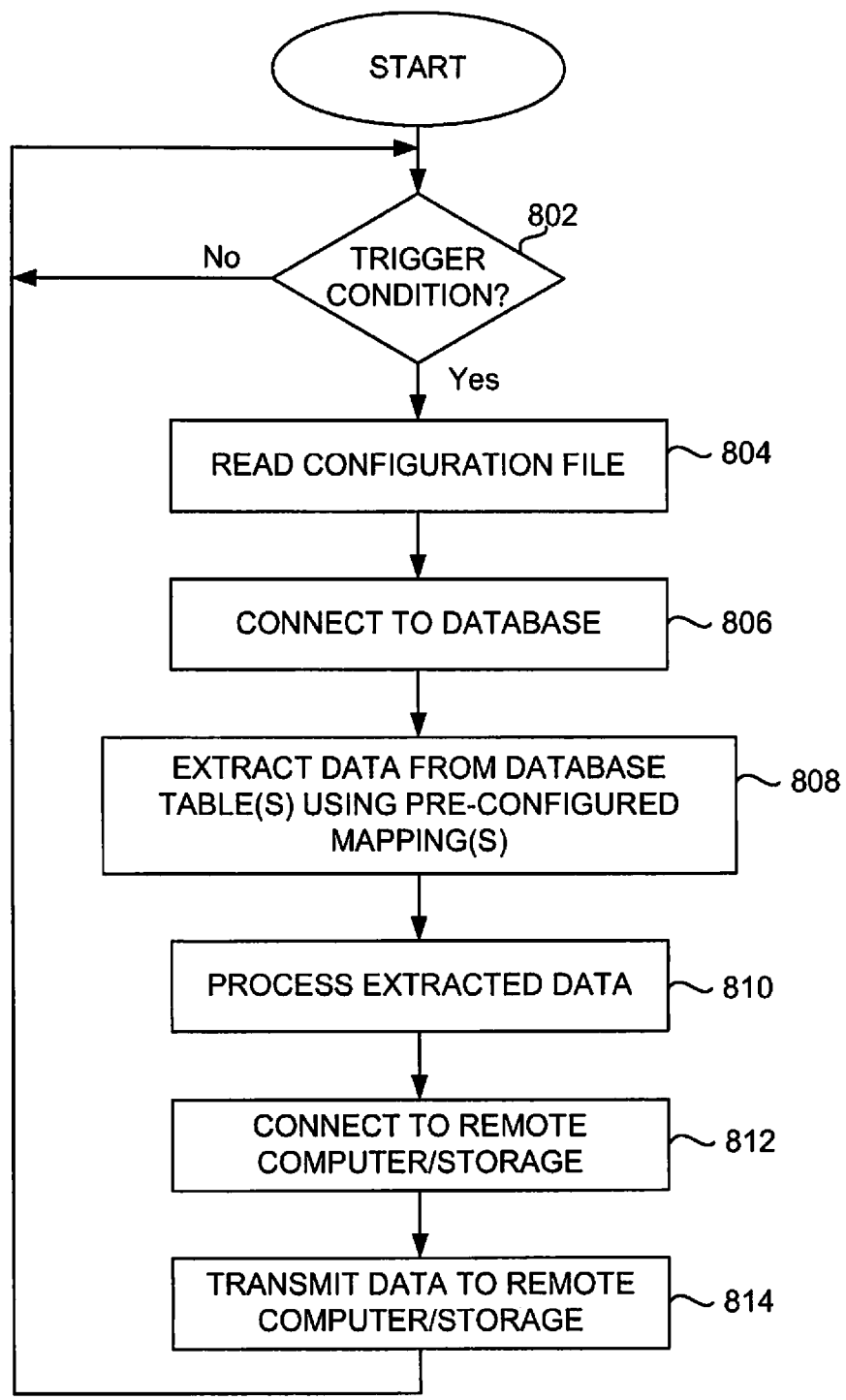
FIG. 8 is a block flow diagram depicting a method for extracting data, in accordance with certain exemplary embodiments.

FIG. 8 is a block flow diagram depicting a method 800 for extracting data, in accordance with certain exemplary embodiments. The method 800 is described with reference to components illustrated in FIGS. 5-7. FIG. 8 also illustrates a means for extracting data according to certain exemplary embodiments.

In block 802, a content extractor 506 may wait for a trigger condition. For example, such a trigger condition may be provided in accordance with the user-supplied parameters 616-619 of configuration dialogue 601. As described above, a trigger condition may be based on a periodic setting, an instant setting, or a real time setting. Once the configured trigger event occurs, content extractor 506 may proceed to block 804.

In block 804, content extractor 506 may read configuration file 514 to obtain database connection parameters in accordance with the user-supplied parameters 602-610 of configuration dialogue 601. Content extractor 506 may also obtain table mapping parameters in accordance with the user-supplied mapping provided in table mapping dialogue 702. In block 806, content extractor 506 may attempt to connect to database 504 using the obtained database connection parameters. If the connection attempt is successful, content extractor 506 may proceed to block 808.

In block 808, content extractor 506 may extract data from one or more database tables residing in database 504. For example, content extractor 506 may use the attribute mappings obtained in block 804 to extract data from the specified table fields. Additionally, content extractor 506 may extract data from one or more database tables residing in remote databases 516. In this manner, content extractor 506 can receive data from multiple databases located in the same or different locations. For example, a retailer may operate multiple stores that each store sales data. The content extractor 506 may receive the data from each database 504, 516 to provide a data source for all (or any given portion) of the retailer's distributed sales data.

In block 810, content extractor 506 may process the extracted data. For example, content extractor 506 may verify that the format of the extracted data matches an expected format (for example, uniformity of address data, syntax, etc.). In certain embodiments, content extractor 506 may reformat extracted data if it does not match an expected format and not reformat the extracted data if it does match an expected format.

In the same or additional embodiments, in block 810 content extractor may auto-generate data based on the extracted data. For example, in some embodiments, content extractor 506 may desire the latitude and longitude information for a given store location. This information may not be available in database 504. Thus, content extractor 506 may be configured to generate latitude and longitude information based on an address of a store location where the address information is both available in database 504 and has been properly mapped using mapping dialogue 702. As just described, block 810 may illustrate a means for processing extracted data according to exemplary embodiments.

In block 812, content extractor 506 may attempt to connect to remote storage 508 and/or remote computer 510 using the remote storage and/or remote computer connection parameters obtained, for example, in block 804. If a the connection attempt is successful, content extractor 506 may proceed to block 814, where content extractor 506 may transmit the data (i.e., extracted data with additions/modifications as performed in block 810) to remote storage 508 and/or remote computer 510. After the data is transmitted, content extractor 506 may return to block 802, where it waits for the next trigger condition.

Figure 9:
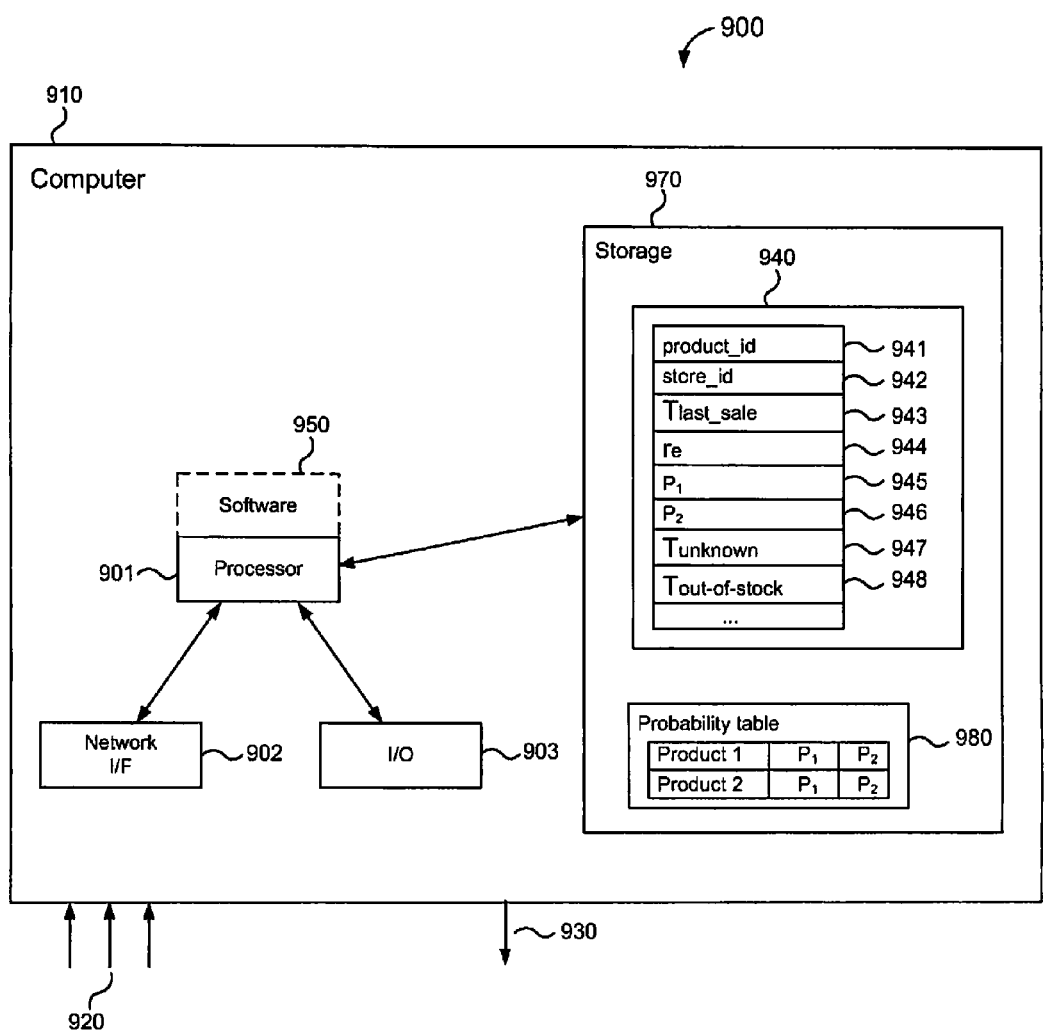
FIG. 9 depicts a system for estimating product availability, in accordance with certain exemplary embodiments.

FIG. 9 depicts a system 900 for estimating product availability, in accordance with certain exemplary embodiments. As depicted in FIG. 9, system 900 may comprise computer 910. Computer 910 may be any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, computer 910 may be a mainframe computer, a network server, a personal computer, a PDA, a consumer electronic device, a network storage device, or any other suitable device and may vary in size, shape, performance, functionality, and price.

Computer 910 may include one or more processing resources (for example, processor 901). For example, processor 901 may comprise any system, device, or apparatus operable to interpret and/or execute program instructions and/or process data associated with software module 950, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 901 may interpret and/or execute program instructions and/or process data stored locally. In the same or alternative embodiments, processor 901 may interpret and/or execute program instructions and/or process data stored remotely.

Additional components of the computer 910 may include one or more storage resources. For example, computer 910 may include storage resource 970, which may be a local storage resource (for example, as described with respect to local storage resource 362 of FIG. 3) or a remote storage resource (for example, as described with respect to remote storage 508 of FIG. 5). Computer 910 may also include one or more communications ports for communicating with external devices (for example, network I/F 902, I/O 903, etc.) as well as various input and output (I/O) devices, such as a keyboard, a mouse, and a video display. The computer 910 also may include one or more buses operable to transmit communication between the various hardware components.

According to certain exemplary embodiments, computer 910 may be implemented as part of a commercial retailer's computer system, for example, located at the retailer's headquarters, regional office, or at a specific retail store. In other exemplary embodiments, computer 910 may be implemented as part of a third party computer system, for example, located remotely at the third-party's place of business or located at a retailer's headquarters, regional office, retail store, etc. (while being owned/operated by the third party). Computer 910 may be configured to receive inputs 920. According to certain exemplary embodiments, inputs 920 include, for example, POS data, inventory feeds, bar code scans, global positioning system (GPS) data, receipt data (from users or companies), other "non-merchant" data, such as data from a third party aggregator, and other data. Inputs 920 may be available in real time (for example, as soon as possible accounting for network/communication/system latency) or on a periodic basis (for example, batch updates from the retailer scheduled every minute, every hour, every eight hours, once a day, or other suitable time period.).

Computer 910 may be configured to provide product availability estimation output 930. According to certain exemplary embodiments, output 930 may be used to provide a product availability estimate to a potential purchaser (for example, a consumer). For example, computer 910 may be configured as an Internet search engine/web server. In this embodiment, a consumer may conduct an Internet search for a specific product. In response to the consumer's search request, computer 910 may provide search results, including product availability estimation output 930. The search results may include nearby commercial retailers that carry the product, as well as the product availability estimation output 930 for each of those retailers, for example, to indicate whether the product is available for sale at each of the nearby retail stores. Alternatively, computer 910 may be configured as a stand-alone product availability estimation system such that output 930 is communicatively coupled to, for example, an Internet search engine/web server. In response to an Internet search for a specific product, this alternative embodiment may behave as just described, with the exception that the web server and computer 910 are distinct pieces of hardware. Accordingly, the web server may query computer 910 to obtain product availability estimation output 930 (on a per-store basis), so that this information may be provided along with the search results.

In other exemplary embodiments, output 930 may be used to provide product availability estimates to a commercial retailer. In this embodiment, computer 910 may be a terminal (for example, a POS terminal, an inventory room terminal, or other terminal) located at a commercial retailer's store, or a stand-alone system coupled (either locally or remotely) to such a terminal. According to this embodiment, the estimated availability of a specific product may be obtained by, for example, a store employee using the terminal. The terminal in this embodiment would behave similarly to the Internet search engine/web server described above so that when computer 910 is queried regarding the availability of a specific product, an estimated product availability is provided on output 930 (for example, so that it can be displayed on the terminal's monitor).

According to certain exemplary embodiments, computer 910 may include software module 950. Software module 950 may estimate the availability of a specific product (i.e., generate output 930) based on the velocity of sales events of that product. For example, the velocity of sales events ($r_e$) may be expressed by the equation $$r_e = N_e/T,$$

where $N_e$ is the number of sales events during time period T. According to certain exemplary embodiments, $r_e$ may be estimated from an average time ($<t>$) between sales events. For example, $r_e$ may be expressed by the equation $$r_e \approx r_{e<t>} = 1/<t>.$$

After observing i sales events, $<t>$ may be estimated recursively as $$<t>_i = (1-k)*<t>_{i-1} + k*t_i,$$

where $t_i$ is the time between sales events i and i−1, and k is some constant where (0<k<1). Accordingly, the velocity of sales events ($r_e$) may be represented by an exponential moving average such that the more recent events may have more weight than events in the past (i.e., the weight of past events may be decaying exponentially).

According to certain exemplary embodiments, when estimating product availability, software module 950 may adjust time values to account for normal business hours. For example, if a store closes at 5:00 pm and opens the next morning at 9:00 am, and the last two sales of a given product occurred at 4:58 pm and 9:02 am the next morning, software 950 may determine that the time between sales events is 4 minutes.

Table 1 provides example data for estimating the velocity of sales events ($r_e$) according to certain exemplary embodiments.

TABLE 1

| Time of Sale Event (minutes) | Number of Units Sold | Time Between Sales Events ($t_i$) |
|---|---|---|
| 0 | $u_1 = 1$ | — |
| 1 | $u_2 = 1$ | $t_1 = 1$ |
| 2 | $u_3 = 4$ | $t_2 = 1$ |

TABLE 1-continued

| Time of Sale Event (minutes) | Number of Units Sold | Time Between Sales Events ($t_i$) |
|---|---|---|
| 3 | $u_4 = 2$ | $t_3 = 1$ |
| 5 | $u_5 = 3$ | $t_4 = 2$ |
| 12 | $u_6 = 5$ | $t_5 = 7$ |
| 16 | $u_7 = 3$ | $t_6 = 4$ |
| 17 | $u_8 = 2$ | $t_7 = 1$ |
| 25 | $u_9 = 4$ | $t_8 = 8$ |

According to the example sales data in Table 1, the absolute rate of sales events is 8/25=0.32 events/minute (8 events in 25 minutes, first event is not counted). This rate is approximate because the end of the time period is chosen arbitrarily to coincide with the last sales event. Using this example sales data, $<t>_8$ may be estimated recursively:

$$<t>_8 = (1-k) * <t>_7 + (k * t_8)$$

$$= (1-k) * ((1-k) * ((1-k) * ((1-k) * ((1-k) * ((1-k) * ((1-k) * t_1 + (k * t_2)) + (k * t_3)) + (k * t_4)) + (k * t_5)) + (k * t_6)) + (k * t_7)) + (k * t_8)$$

Again, k may be a constant value between 0 and 1. For example, assuming k is 0.1, the above equation may be solved:

$$<t>_8 \approx 2.4$$

Since $r_e = 1/<t>$, the example data results in:

$$r_e = 1/<t> = 1/2.4 = 0.42$$

Thus, assuming k is 0.1, the estimated rate of sales events $r_e$ for the example data is 0.42 events/minute. It should be noted that a smaller k may give more weight to past events, whereas a bigger k may give more weight to the more recent events. The effect of the chosen value of k is illustrated in Table 2, which provides the estimated rate of sales events ($r_e$) for the example data of Table 1 assuming different values of k.

TABLE 2

| k | $r_e$ |
|---|---|
| 0.02 | 0.76 |
| 0.05 | 0.57 |
| 0.10 | 0.42 |
| 0.20 | 0.29 |
| 0.30 | 0.24 |
| 0.50 | 0.19 |

According to certain exemplary embodiments, averaging the estimated rate of sales events over the last 10-30 sales may provide a reasonable assumption. Thus, k may be in the range $0.03 \leq k \leq 0.1$.

According to certain exemplary embodiments, the estimated rate of sales events may be used to estimate the availability of a product. For example, software module 950 of computer 910 may receive POS data (for example, as all or some of inputs 920) including line item data. A single line item may represent a sales event where one or more instances of a given product are sold at a given time at a given store location. According to an exemplary embodiment, software module 950 may assume that the sales events follows a Poisson distribution (which may or may not be uniform). Accordingly, given an estimated rate of sales events $r_e$, software module 950 may approximate the probability of not seeing any sales events for a duration t as $\exp(-r_e * t)$.

For example, assuming a rate of sales events $r_e = 0.04$ events/minute (2.4 events/hour), the average time between sales events would be $1/2.4 \approx 0.42$ hours $\approx 25$ minutes. In this example, if the last sale occurred at 12:00 pm, the probability of not seeing any sales events for a duration of 1 hour (i.e., until 1:00 pm) may be approximated as $\exp(-2.4*1) = 0.091$. Similarly, the probability of not seeing any sales events for a duration of 5 hours (i.e., until 5:00 pm) may be approximated as $\exp(-2.4*5) = 6.14e^{-6}$.

According to certain exemplary embodiments, software module 950 may define probabilities $p_1$ and $p_2$ (where $p_1 > p_2$) with the following properties:

if zero sales events occur for a duration $t_0$ such that $(\exp(-r*t_0) > p_1)$, the estimated product availability is listed as "in stock";

if zero sales events occur for a duration $t_1$ such that $(p_1 > \exp(-r*t_1) > p_2)$, the estimated product availability is listed as "unknown"; and if zero sales events occur for a duration $t_2$ such that $(\exp(-r*t_2) < p_2)$, the estimated product availability is listed as "out of stock."

According to certain exemplary embodiments, the probabilities $p_1$ and $p_2$ may be consistent across all products. For example, all products may have $p_1 = 0.1$ and $p_2 = 0.01$. According to an alternative embodiment, the probabilities $p_1$ and $p_2$ may be consistent on a per-product basis. For example, product A may have $p_1 = 0.1$ and $p_2 = 0.01$, product B may have $p_1 = 0.2$ and $p_2 = 0.03$, etc. In some embodiments, the probabilities $p_1$ and $p_2$ may be relatively static. In other embodiments, the probabilities $p_1$ and $p_2$ may be variable with time, for example, subject to adjustment based on feedback/analysis of the performance of the product estimation system 900.

In yet another embodiment, the probabilities $p_1$ and $p_2$ may be the same, such that the "unknown" condition cannot be met (i.e., only "in stock" and "out of stock" indicators may be provided).

Computer 910 of FIG. 9 may comprise data object 940. According to certain exemplary embodiments, data object 940 may reside in storage resource 970 and be used in determining product availability estimation output 930. Data object 940 may comprise the following data fields: product ID 941, store ID 942, last sale timestamp 943 ($T_{last\_sale}$), sales event rate 944 ($r_e$), probability 945 ($p_1$), probability 946 ($p_2$), unknown switch time 947 ($T_{unknown}$), and out-of-stock switch time 947 ($T_{out-of-stock}$). According to an exemplary embodiment, computer 910 may include a separate data object 940 for each product-store combination. In other words, computer 910 may have one data object 940 for each product sold at a given store. Accordingly, product ID 941 may correspond to a particular product, and store ID 942 may correspond to the particular store at which the particular product sold. Last sale timestamp 933 may correspond to the time of the last sale of the identified product at the identified store. According to certain exemplary embodiments, software module 950 of computer 910 may receive each of product ID 941, store ID 942, and last sale timestamp 933 as POS data (for example, as all or some of inputs 920) including line item data.

In certain embodiments, software module 950 may determine sales event rate 944 ($r_e$) upon receiving POS data. For example, after receiving POS data including line item data, software module 950 may retrieve data object 940 (for example, from a database, a flat file, or other source) using the product ID and store ID in the received line item data. Retrieved data object 940 may already comprise a non-NULL value for sales event rate 944 (for example, if this is not the first sale of the product corresponding to the product ID and store ID in the received line item data). Regardless, a new sales event rate 944 may be determined as an exponential moving average each time software module 950 receives new line item data. As described above, software module 950 may use the following formula to determine the new sales event rate 944:

$$r_e \approx r_{e<t>} = 1/<t>.$$

Thus, each time software module 950 receives new line item data, software module 950 may replace the sales event rate 944 of data object 940 with the newly-determined sales event rate.

In certain exemplary embodiments, software module 950 may determine last sale timestamp 943 ($T_{last\_sale}$), unknown switch time 947 ($T_{unknown}$), and out-of-stock switch time 947 ($T_{out-of-stock}$) upon receiving POS data including line item data. For example, last sale timestamp 943 may be part of the received line item data (for example, POS data as described above with respect to FIG. 4). In such a case, software module 950 may copy the timestamp in the line item data into the last sale timestamp 943 field of data object 940. In other embodiments, software module 950 may store the time of actual receipt of the POS data into the last sale timestamp 943 field of data object 940. After determining the new sales event rate 944, software module 950 may determine unknown switch time 947 ($T_{unknown}$) and out-of-stock switch time 947 ($T_{out-of-stock}$) according to the following:

$$T_{unknown} = T_{last\_sale} - \log(p_1)/r_e$$

$$T_{out-of-stock} = T_{last\_sale} - \log(p_2)/r_e$$

For example, after receiving POS data including line item data, data object 940 may contain the following values:
product_id: 45
store_id: 178
sales_event_rate: 0.04 (events/minute)
last_sale: 12:00 pm
$p_1$: 0.1
$p_2$: 0.01
According to this example data, $$T_{unknown} = T_{last\_sale} - \log(p_1)/r_e = 12{:}00 \text{ pm} - \log(0.1)/0.04 = 12{:}25 \text{ pm}$$

$$T_{out-of-stock} = T_{last\_sale} - \log(p_2)/r_e = 12{:}00 \text{ pm} - \log(0.01)/0.04 = 12{:}50 \text{ pm}$$

In this example, software module 950 may store the calculated values of $T_{unknown}$ (12:25 pm) and $T_{out-of-stock}$ (12:50 pm) into unknown switch time 947 and out-of-stock switch time 947 fields of data object 940. Accordingly, assuming no additional POS data for product_id:45 and store_id:178 is received, software module 950 of computer 910 may estimate product availability as "in stock" between 12:00 pm and 12:25 pm, as "unknown" between 12:25 pm and 12:50 pm, and as "out of stock" after 12:50 pm. Software module 950 may provide such estimates as product availability estimation output 930.

Figure 10:
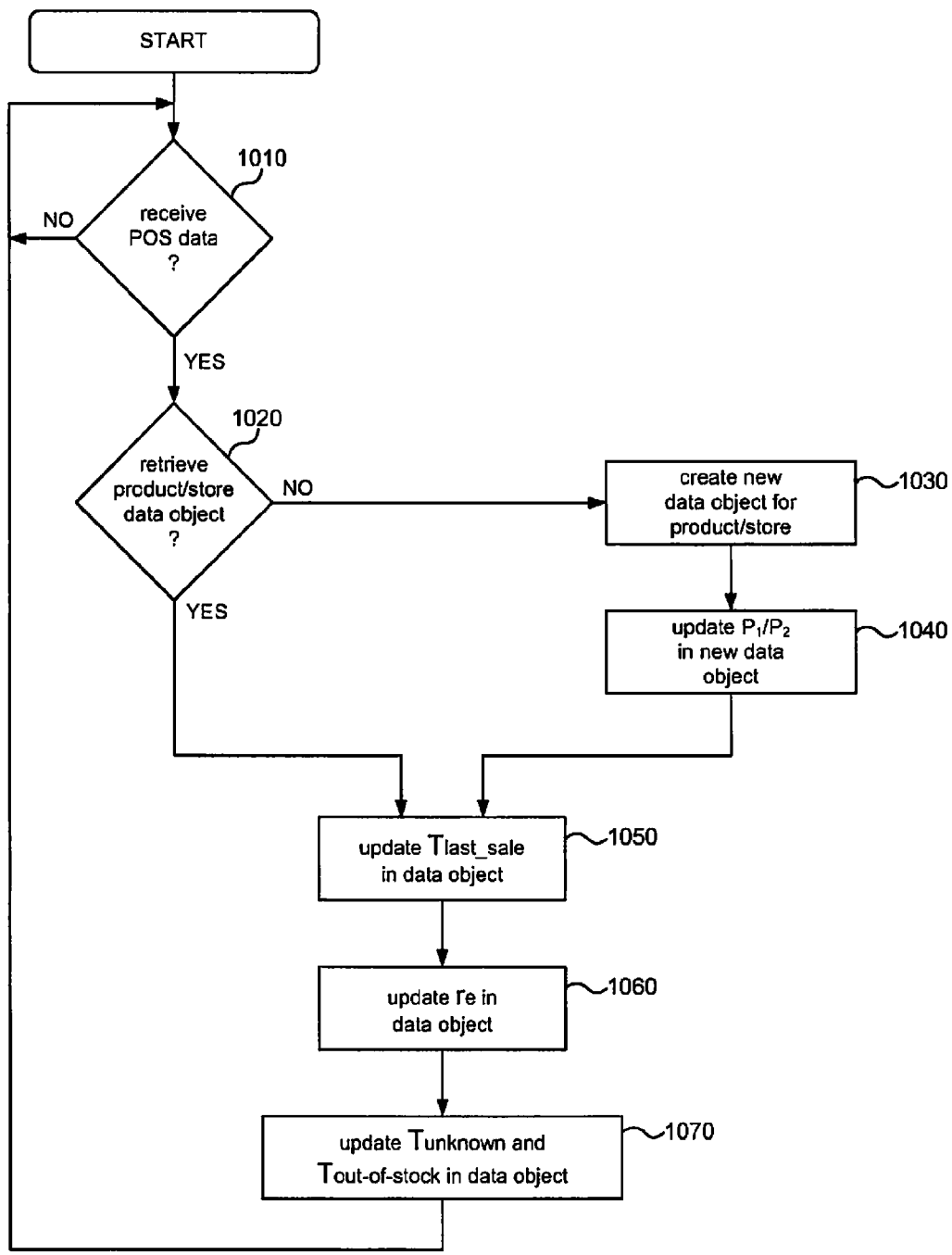
FIG. 10 depicts a block flow diagram depicting a method for estimating product availability, in accordance with certain exemplary embodiments.

FIG. 10 depicts a block flow diagram depicting a method 1000 for estimating product availability, in accordance with certain exemplary embodiments. The method 1000 is described with reference to components illustrated in FIGS. 1 and 9.

In block 1010, a software module 950 of computer 910 may wait to receive POS data. According to certain exemplary embodiments, POS system 100 will collect POS data via POS data collector 105 and will communicate the POS data to computer 910 as line item data on all or some of inputs 920. After receiving POS data, software module 950 will proceed to block 1020 and attempt to retrieve a data object (for example, data object 940) corresponding to the product_id and store_id that was received in the POS data. If such data object exist does not exist, software module 950 may proceed to block 1030 and create a new data object corresponding to the product_id and store_id that was received in the POS data.

After creating a new data object in block 1030, software module 950 may proceed to block 1040 and update the $p_1$ and $p_2$ probability fields of the new data object. In certain embodiments, the value of $p_1$ and $p_2$ may be predetermined, such that all new data objects are initialized with the same $p_1$ and $p_2$ values regardless of the product. In other embodiments, the value of $p_1$ and $p_2$ may be predetermined, but may be specific to a product or product category. In this latter embodiment, for example, computer 910 may include probability table 980 so that software module 950 may perform a look-up using the received product_id. In still other embodiments, probabilities $p_1$ and $p_2$ may be fixed on a system-wide basis so that there isn't any need to include these fields as part of data object 940. In still other embodiments, these probabilities may be derived, as discussed previously.

Once software module 950 has retrieved an existing data object (i.e., block 1020) or created a new data object (i.e., blocks 1030, 1040), it may proceed to block 1050. In block 1050, software module 950 may update the $T_{last\_sale}$ value. As described above, software module 950 may copy $T_{last\_sale}$ directly from a timestamp in the received POS data, or it may update $T_{last\_sale}$ with the current time. In block 1060, software module 950 may update the $r_e$ field (rate of sales events) as described above. In block 1070, software module 950 may update the $T_{unknown}$ and $T_{out-of-stock}$ fields as described above.

Figure 11:
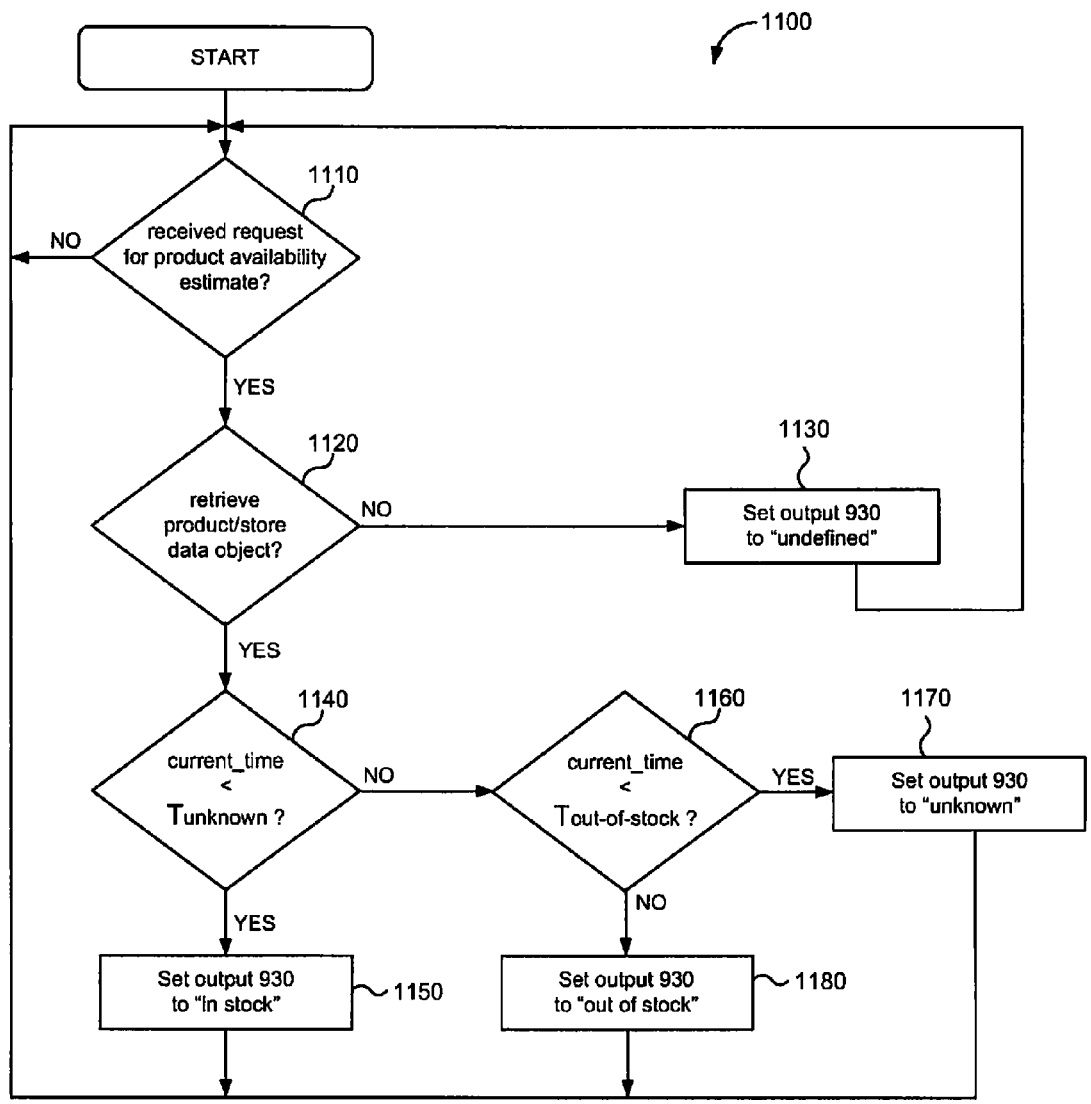
FIG. 11 depicts a block flow diagram depicting a method for estimating product availability in accordance with certain exemplary embodiments.

FIG. 11 depicts a block flow diagram depicting a method 1100 for estimating product availability, in accordance with certain exemplary embodiments. The method 1100 is described with reference to components illustrated in FIGS. 1 and 9.

In block 1110, software module 950 of computer 910 may wait to receive a request for a product availability estimate. In certain embodiments, computer 910 may be configured as an Internet search engine/web server. In this embodiment, a consumer may conduct an Internet search for a specific product. As a result of the search, computer 910 may determine that one or more retail stores offer the specific product for sale. Accordingly, the consumer's search initiates a request for a product availability estimate so that software module 950 may indicate whether the product is available at the one or more retail stores. According to other embodiments, computer 910 may be configured as a stand-alone product availability estimation system. According to this embodiment, a request for a product availability estimate may arrive via one or more of inputs 920.

After receiving a request in block 1110, software module 950 may proceed to block 1120 and attempt to retrieve a data object (for example, data object 940) corresponding to the product_id and store_id specified in the request received in block 1110. If such data object does not exist, software module 950 may proceed to block 1130. In some embodiments, software module 950 may set product availability estimate output 930 to "undefined" in block 1130 because data corresponding to the request does not exist. In this case, the product availability output 930 may be set to "call for availability" or "limited" to indicate that stock level should be verified.

Once software module 950 has retrieved an existing data object in block 1120, software module 950 may proceed to block 1140. In block 1140, software module 950 may compare the current time with the time stored in the $T_{unknown}$ field of the retrieved data object. If the current time is earlier than $T_{unknown}$, software module 950 may proceed to block 1150 and set product availability estimate output 930 to "in stock." If the current time is later than $T_{unknown}$), software module 950 may proceed to block 1160.

In block 1160, software module 950 may determine whether the current time is earlier than the time stored in the $T_{out-of-stock}$ field of the retrieved data object. If so, software module 950 may proceed to block 1170 and set product availability estimate output 930 to "unknown." Alternatively, if the current time is later than the time stored in the $T_{out-of-stock}$ field, software module 950 may proceed to block 1180 and set product availability estimate output 930 to "out of stock." In certain exemplary embodiments, software module 950 may operate only with the "in stock" and "out of stock" options.

According to certain exemplary embodiments, software module 950 may estimate the availability of a specific product (in other words, generate output 930) based on the velocity of sales of that product (as opposed to the velocity of sales events, as described above). In this embodiment, the number of items in a transaction can be assumed to be independent from the timing of the sales events. Thus, the velocity of sales ($r_s$) may be estimated from $r_e$ by the equation $$r_s = r_e * <u>,$$

where $<u>$ is the average number of units in a sales event. Here, $<u>$ may be calculated in the same manner as $<t>$:

$$<u>_i = (1-k) * <u>_{i-1} + k * u_i,$$

where $u_i$ is the number of units sold during sales event i, and k is some constant where (0<k<1). Accordingly, the velocity of sales ($r_s$) may be represented by an exponential moving average such that the more recent sales may have more weight than sales in the past (i.e., the weight of past sales may be decaying exponentially).

According to the example sales data in Table 1, the absolute rate of sales events is $25/9$=2.78 units/sale. Using this example sales data, $<u>_9$ may be estimated recursively:

$$<u>_9 = (1-k) * <u>_8 + (k * u_9)$$
$$= (1 - k * ((1-k) * ((1-k) * ((1-k) * ((1-k) * ((1-k) *$$
$$((1-k) * u_1 + (k * u_2)) + (k * u_3)) + (k * u_4)) + (k * u_5)) + (k * u_6)) +$$
$$(k * u_7)) + (k * u_8)) + (k * u_9)$$

Again, k may be a constant value between 0 and 1. For example, assuming k is 0.1, the above equation may be solved:

$$<u>_9 \approx 2.2 \text{ units/sale}$$

Since $r_s = r_e * <u>$, the example data results in the following estimated velocity of sales:

$$r_s = 0.42 \text{ events/minute} * 2.2 \text{ units} = 0.924 \text{ units/minute}.$$

Thus, assuming k is 0.1, the estimated rate of sales $r_s$ for the example data is 0.924 units/minute. It should be noted that a smaller k may give more weight to past events, whereas a bigger k may give more weight to the more recent events. Thus, similar to the choice of k for $r_e$, k for $r_s$ may be in the range $0.03 \leq k \leq 0.1$.

According to certain exemplary embodiments, the estimated rate of sales ($r_s$) may be used to estimate the availability of a product. For example, software module 950 of computer 910 may receive an inventory snapshot from a given store, indicating the quantity in inventory ($Q_{feed}$) on a per-product, per-store basis. This snapshot may be provided on inputs 920, for example, as a periodic inventory feed provided by content extractor 506.

In one embodiment, the periodic inventory feed may be provided by content extractor 506 such that software module 950 of computer 910 receives the inventory feed some time after the inventory snapshot was taken. The delay may be known with some degree of certainty, and may be expressed, for example, by the following:

$$T_{feed} = T_{upload} - (\Delta T * \delta),$$

where $T_{feed}$ may be the time when the inventory feed was generated by the store/merchant, $T_{upload}$ may be the time when the feed became available to software module 950 of computer 910, and $\delta$ may be a stochastic variable such that ($\delta > 0$, $<\delta> = 1$). In some embodiments, $\Delta T$ may be reported by the store/merchant, for example, as part of the data transmitted in the periodic inventory feed. Alternatively or additionally, other suitable sources of item level information for merchant or retailer sales can be used, one representative example of which is a third party aggregator of such information. In some embodiments, software module 950 may calculate the $\delta$ statistics from the actual data (for example, based on a number of periodic inventory feed updates, etc.). In other embodiments, software module 950 may assume that $\delta$ is a log-normally distributed random value with some fixed $\sigma$, which is the same for all stores/merchants.

According to certain exemplary embodiments, software module 950 may assume $\delta \equiv 1$, which may simplify the delay calculation as:

$$T_{feed} = T_{upload} - \Delta T.$$

In some embodiments, software module 950 may store the list of sales events between successive periodic inventory feeds and use data from these stored sales events along with the inventory feed, $Q_{feed}$, to calculate the inventory, $Q_{upload}$, at the time the inventory feed is uploaded into software module 950 of computer 910 (in other words, time $T_{upload}$). For example, $Q_{upload}$ may be calculated according to the following equation:

$$Q_{upload} = Q_{feed} - \Sigma_{T_{feed}}^{T_{upload}} U,$$

where U is the quantity of items in a given sale. According to certain exemplary embodiments, software module 950 may implement the above function with instructions corresponding to the following pseudo-code:

```
CalculateQupload (product_id, q_feed, t_feed, sales_events) {
    // product_id: product for which q_upload is to be calculated
    // q_feed: inventory at the time the snapshot was taken
    // t_feed: time when the snapshot was taken
    // sales_events: array of all sales data for a given store
    q_upload = q_feed;
    t_upload = current_time( );
    foreach (event in sales_events) {
        if ((event.product_id == product_id) &&
            (event.timestamp < t_upload) &&
            (event.timestamp > t_feed)) {
            q_upload = q_upload - event.quantity;
        }
        // certain embodiments may remove data from the
        //   sales_events array in order to reduce the
        //   required amount of storage needed, for example, by
        //   deleting any data that is older that t_feed:
        if ((event.product_id == product_id) &&
            (event.timestamp < t_feed)) {
```

-continued

```
        delete (event);
    }
}
return q_upload;
}
```

According to certain exemplary embodiments, software module 950 may estimate the inventory, $Q_{upload}$, at the time the inventory feed is uploaded. For example, software module 950 may estimate the inventory according to the following equation:

$$Q_{upload} = Q_{feed} - (r_s * \Delta T).$$

This estimation may rely on the fact that the current inventory, $Q_{upload}$, may be close in number to the inventory at the time the inventory snapshot was taken less the rate of sale times $\Delta T$; i.e., $\Delta T$ may be the difference in time between when the snapshot was taken and when the data was uploaded into software module 950 of computer 910 ($T_{upload} - T_{feed}$).

Software module 950 may distribute the number of items, N, that are sold in the period $\Delta T$ with probabilities. For example, according to the probability:

$$Pr(N, r_s \Delta T) = \frac{(r_s \Delta T)^N \exp(-r_s \Delta T)}{N!}.$$

Where ($x=r_s \Delta T$), the above equation may be simplified as:

$$Pr(N, x) = \frac{x^N \exp(-x)}{N!}$$

Thus, software module 950 may determine the probability of selling N units or fewer of any given product according to a cumulative distribution function, for example:

$$Pr(N, x) = \sum_{k=0}^{N} \frac{x^k e^{-x}}{k!} = e^{-x} \sum_{k=0}^{N} \frac{x^k}{k!}$$

The following example data provides an illustration:
$Q_{feed}=22$ (i.e., the quantity in inventory when the inventory snapshot was taken)
$\Delta T=1$ (i.e., the snapshot was generated 1 hour before it was uploaded)
$r_s=10$/hour (i.e., current rate of sale is 10 items per hour)
$Q_{sold}=7$ (i.e., after the snapshot was uploaded, 7 items were sold)

With this example data, software module 950 may estimate the current number of remaining items in inventory, $Q_{now}$, as:

$$Q_{now} = Q_{feed} - Q_{sold} - (r_s * \Delta T)$$
$$= 22 - 7 - (10 * 1)$$
$$= 5$$

Accordingly, software module 950 may determine that $Q_{now}=5$, and may indicate (via output 930) that the product is "in stock." This value of $Q_{now}$ is an approximate value because the store may have sold more or less than 10 items in the time $\Delta T$.

In some embodiments, software module 950 may additionally or alternatively use probabilities to estimate the availability of a product. Given the above example data, software module 950 may determine that a product is in stock if there is a high probability that 14 or fewer items were sold during time $\Delta T$. (Because $Q_{feed} - Q_{sold} = 15$, a maximum of 14 items may be sold during time $\Delta T$ and still result in an "in stock" indication on output 930 because there would still be one more item in stock.) As described above, software module 950 may determine the probability that 14 or fewer items were sold according to:

$$Pr(N, x) = e^{-x} \sum_{k=0}^{N} \frac{x^k}{k!}$$

$$Pr(14, 10) = e^{-10} \sum_{k=0}^{14} \frac{10^k}{k!} = 0.91 \text{ (calculated numerically)}$$

Thus, software module 950 may determine that there is a 91% probability that the item is "in stock" and a 9% probability that the product is "sold out."

According to certain exemplary embodiments, software module 950 may define probability thresholds for estimating whether a product's availability is "in stock," "unknown," or "out of stock." For example, software module 950 may estimate that a product's availability is "in stock" when the probability of having an item in stock is above 0.5 and "unknown" when it falls below 0.5. Likewise, software module 950 may estimate that a product's availability is "out of stock" when the probability of having an item in stock falls below 0.1. In some embodiments, these probability thresholds may be consistent across all products. For example, all products may use 0.5 for the "unknown" estimate and 0.1 for the "out of stock" estimate. According to an alternative embodiment, the probability thresholds may be consistent on a per-product basis. For example, product A may have 0.5 for the "unknown" estimate and 0.1 for the "out of stock" estimate, product B may have 0.3 for the "unknown" estimate and 0.05 for the "out of stock" estimate, etc. In some embodiments, the probability thresholds may be relatively static. In other embodiments, the probability thresholds may be variable with time, for example, subject to adjustment based on feedback/analysis of the performance of the product estimation system 900 (for example, software 950 may derive the probability thresholds from an acceptable false positives rate).

According to certain exemplary embodiments, software module 950 may define one probability threshold for estimating whether a product's availability is "in stock" or "out of stock." For example, software module 950 may estimate that a product's availability is "in stock" when the probability of having an item in stock is above 0.5 and "out of stock" when it falls below 0.5.

Figure 12:
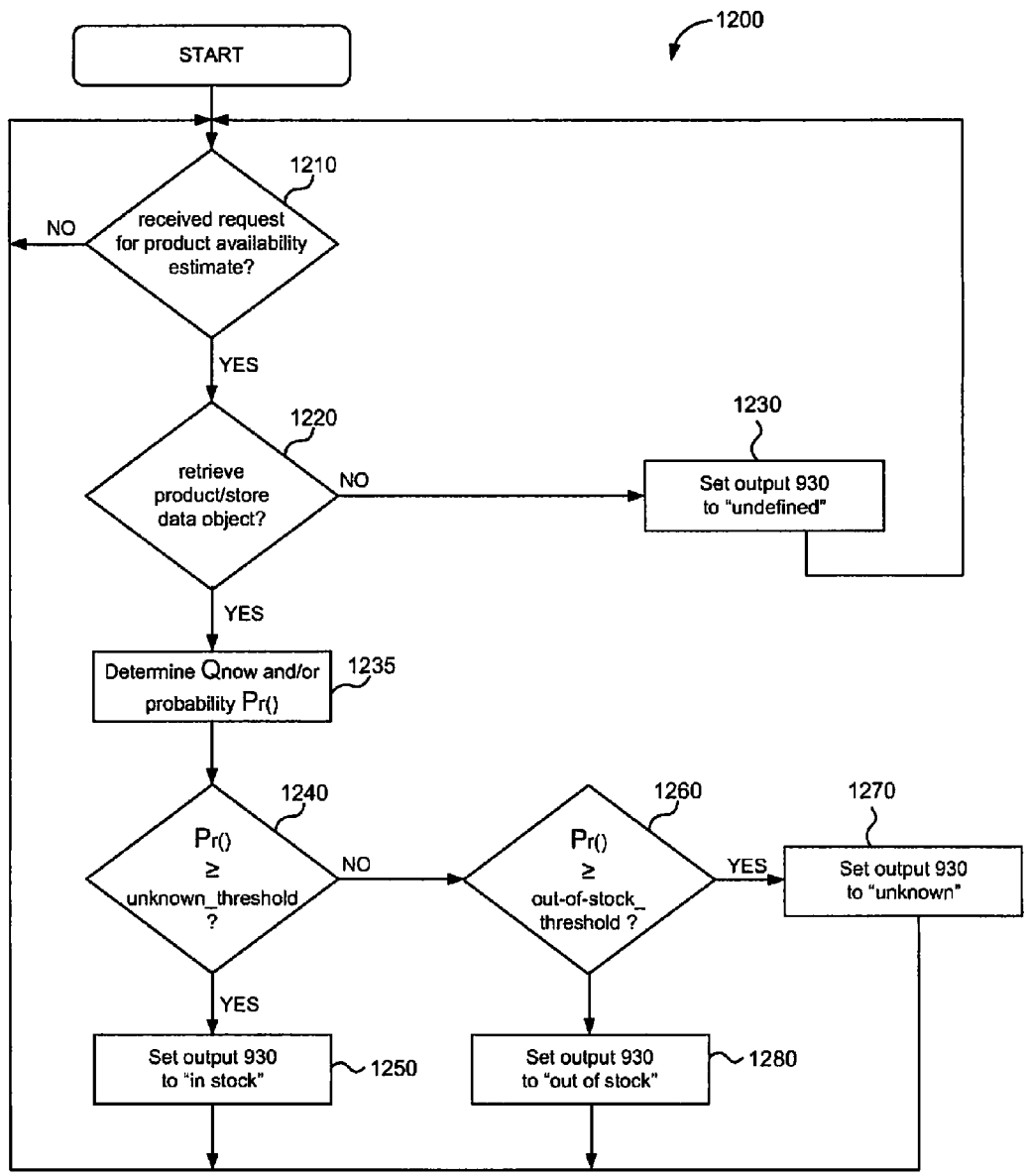
FIG. 12 depicts a block flow diagram depicting a method for estimating product availability in accordance with certain exemplary embodiments.

FIG. 12 depicts a block flow diagram depicting a method 1200 for estimating product availability, in accordance with certain exemplary embodiments. The method 1200 is described with reference to components illustrated in FIGS. 1, 9, and 13.

In block 1210, software module 950 of computer 910 may wait to receive a request for a product availability estimate. In certain embodiments, computer 910 may be configured as an Internet search engine/web server. In this embodiment, a consumer may conduct an Internet search for a specific product. As a result of the search, computer 910 may determine that one or more retail stores offers the specific product for sale. Accordingly, the consumer's search initiates a request for a product availability estimate so that software module 950 may indicate whether the product is available at the one or more retail stores. According to other embodiments, computer 910 may be configured as a stand-alone product availability estimation system. According to this embodiment, a request for a product availability estimate may arrive via one or more of inputs 920.

After receiving a request in block 1210, software module 950 may proceed to block 1220 and attempt to retrieve a data object (for example, data object 1300) corresponding to the product_id and store_id specified in the request received in block 1210. If no such data object exists, software module 950 may proceed to block 1230. In some embodiments, software module 950 may set product availability estimate output 930 to "undefined" in block 1230 because there is no data corresponding to the request. In this case, the product availability output 930 may be set to "call for availability" or "limited" to indicate that stock level should be verified.

Once software module 950 has retrieved an existing data object in block 1220, software module 950 may proceed to block 1235. In block 1235, software module 950 may determine the value of $Q_{now}$ and/or the probability Pr( ), as described above. In an exemplary embodiment, only the probability Pr( ) can be used in making this estimation. In an alternative exemplary embodiment, $Q_{now}$ can be used in this estimation, and Pr( ) can be used to verify the result obtained with $Q_{now}$. In block 1240, software module 950 may compare the probability Pr( ) with the probability threshold set for the "unknown" estimate. If probability Pr( ) is greater than the "unknown" threshold, software module 950 may proceed to block 1250 and set product availability estimate output 930 to "in stock." If probability Pr( ) is less than the "unknown" threshold, software module 950 may proceed to block 1260.

In block 1260, software module 950 may determine whether probability Pr( ) is greater than the "out of stock" threshold. If so, software module 950 may proceed to block 1270 and set product availability estimate output 930 to "unknown." Alternatively, if probability Pr( ) is less than the "out of stock" threshold, software module 950 may proceed to block 1280 and set product availability estimate output 930 to "out of stock."

Figure 13:
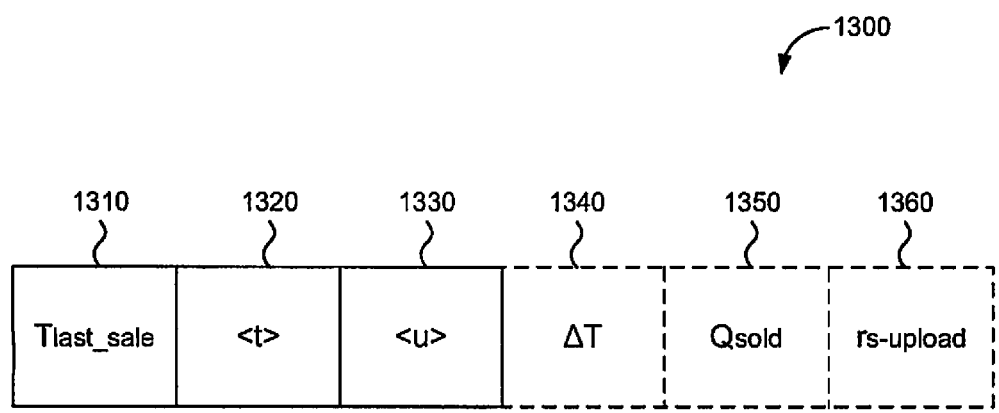
FIG. 13 depicts a block diagram of data object, in accordance with certain exemplary embodiments.

FIG. 13 depicts a block diagram of data object 1300, in accordance with certain exemplary embodiments. Computer 910 may comprise data object 1300. For example, software module 950 may store data object 1300 in storage resource 970. In some embodiments, software module 950 may use the data stored in data object 1300 to provide product availability estimates, as described above with reference to FIGS. 9-12. Typically, computer 910 may comprise one data object 1300 per product-store pair.

While estimating product availability based on a rate of sales events, data object 1300 may comprise the following fields: $T_{last\_sale}$ 1310 (i.e., the last sale timestamp), <t> 1320 (i.e., running average time between sales events), and <u> 1330 (i.e., running average number of units per sales event). Software module 950 may determine $T_{last\_sale}$ 1310, <t> 1320, and <u> 1330 as described with respect to FIG. 9 upon receiving POS data.

While estimating product availability based on a rate of sales, certain embodiments of data object 1300 may additionally comprise the following fields: ΔT 1340 (i.e., time between $T_{feed}$ and $T_{upload}$), and $Q_{now}$ 1350 (number of items sold after an inventory snapshot was uploaded at time $T_{upload}$). ΔT 1340 may be reported by the store/merchant, for example, as part of the data transmitted in the periodic inventory feed. Alternatively, or additionally, sales data can be provided by receipt analysis (from users or companies) and other "non-merchant" data, such as data from a third party aggregator. Software module 950 may determine/store $Q_{sold}$ 1350 in response to all POS data received subsequent to time $T_{upload}$. In other embodiments, data object 1300 may additionally comprise data field $r_{s\text{-}upload}$ 1360 (i.e., the value of $r_s$ at time $T_{upload}$), which may be used in the place of $r_s$ when calculating Pr( ). In certain embodiments, the data stored in data object 1300 may allow software module 950 to provide product availability estimates (for example, on output 930) without the need to store all of the line item data received via POS data on inputs 920.

In certain exemplary embodiments, product availability can be determined based on line item sales data. For example, if an item is currently listed as "unknown" or "out of stock," the product availability can be updated to "in stock" based receipt of new sales data that includes sales of the particular product. If a store is selling the product, then it is in stock. In this exemplary embodiment, product availability can be estimated without knowing actual inventory for the store.

Figure 14:
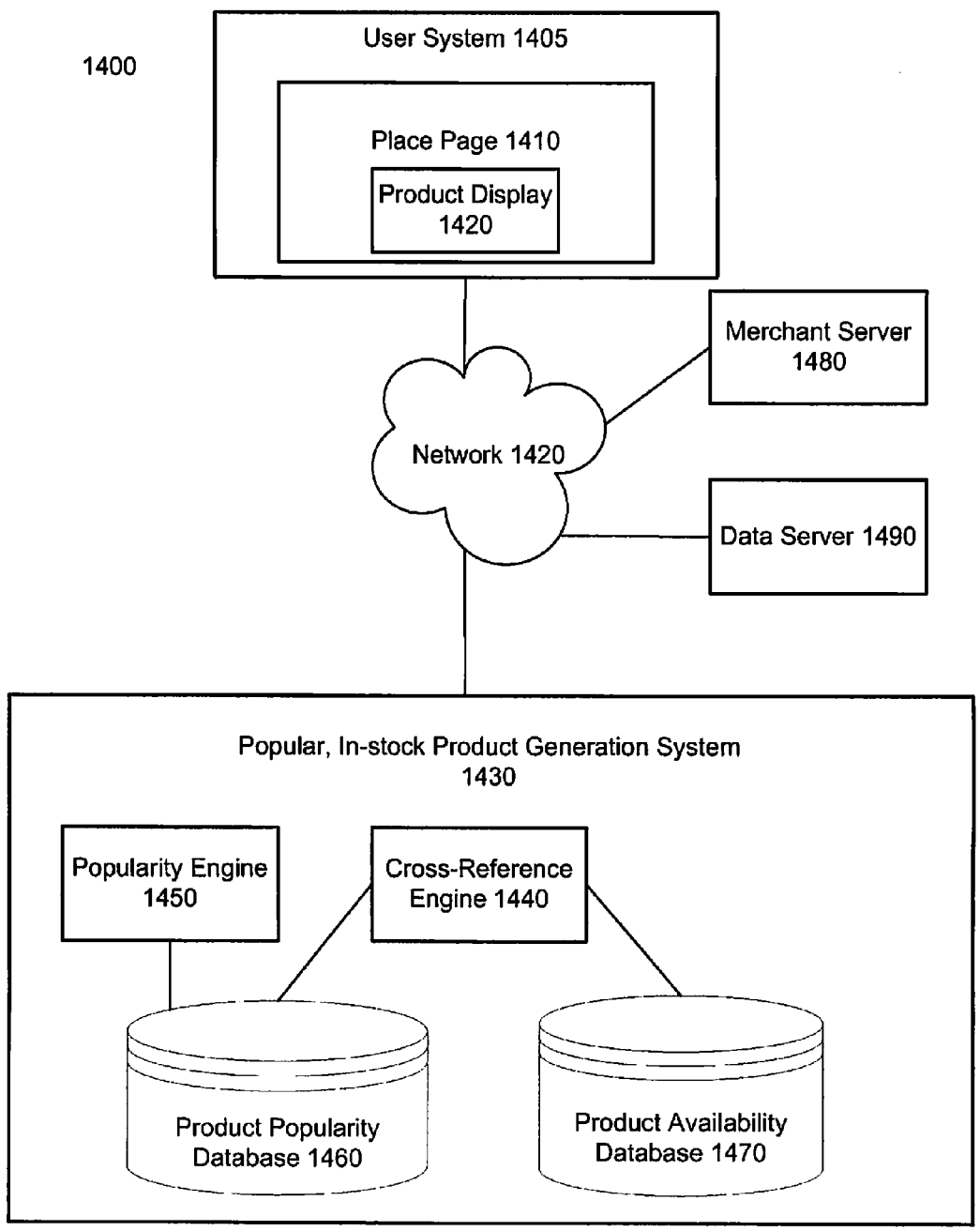
FIG. 14 is a block diagram depicting a system for displaying products on a place page, in accordance with certain exemplary embodiments.

FIG. 14 depicts a system 1400 for displaying a place page 1410 on a user system 1405, in accordance with certain exemplary embodiments. As depicted in FIG. 14, system 1400 comprises network devices, such as user system 1405, popular, in-stock product generation system 1430, data server 1490, and merchant server 1480, which are configured to communicate with one another via one or more networks 1420. Each network 1420 includes a wired or wireless telecommunication means by which network devices (including devices 1405, 1430, 1480, 1490) can exchange data. For example, each network 1420 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 1405, 1430, 1480, 1490 includes a device having a communication module capable of transmitting and receiving data over the network 1420. For example, each network device 1405, 1430, 1480, 1490 can include a server, desktop computer, laptop computer, tablet computer, smartphone, handheld computer, personal digital assistant ("PDA"), or any other wired or wireless, processor-driven device.

The user system 1405 comprises an electronic device that is capable of displaying information and connecting to the network 1420. Examples include a personal computer, a mobile computing device, or other electronic devices, in accordance with alternative exemplary embodiments. The place page 1410 and product display 1420 presented on the user system 1405 are described in more detail below with reference to FIG. 19.

As depicted in FIG. 14, the popular, in-stock product generation system 1430 pulls data from two primary databases: a product popularity database 1460 and a product availability database 1470. The information from the product popularity database 1460 and the product availability database 1470 is then made available to a cross-reference engine 1440 through wired or wireless means, in one embodiment, or by direct communication within a single computing component, in another embodiment. The cross-reference engine 1440 applies certain methods of matching the products in each database, which are explained in further detail below with reference to FIGS. 15-18.

The product availability database 1470 may be populated, in certain embodiments, by direct information provided from a merchant server 1480 in connection with the network 1420, which allows transfer of information through the network 1420 to the product availability database 1470. In one exemplary embodiment, a merchant may simply provide a list of current inventory information that can be used to populate the product availability database 1470. This information could be, in one embodiment, dynamically linked, so that the information is available in real time, or the merchant inventory information can be periodically updated in batches at certain time intervals, in another embodiment. In other embodiments, the product availability database may access or information on, or receive information from, a data server 1490 to provide product availability information. The data server 1490 may provide inventory information through the various systems and methods described previously with reference to FIGS. 1-13.

The product popularity database 1460 may contain a list of products ranked by popularity. The list of products can be generated by input from merchant servers 1480 and also by data servers 1490. The data server may take into account recent transactions over the Internet, typical search terms used in attempting to locate, read about, or purchase products over the Internet, manual or automatic entry of terms, or otherwise. Once the product popularity database 1460 is populated with a product list, the popularity engine 1450 may rank or order or assign values to the products relative to their popularity. The methods by which popularity may be determined are described in more detail with respect to FIG. 16.

Figure 15:
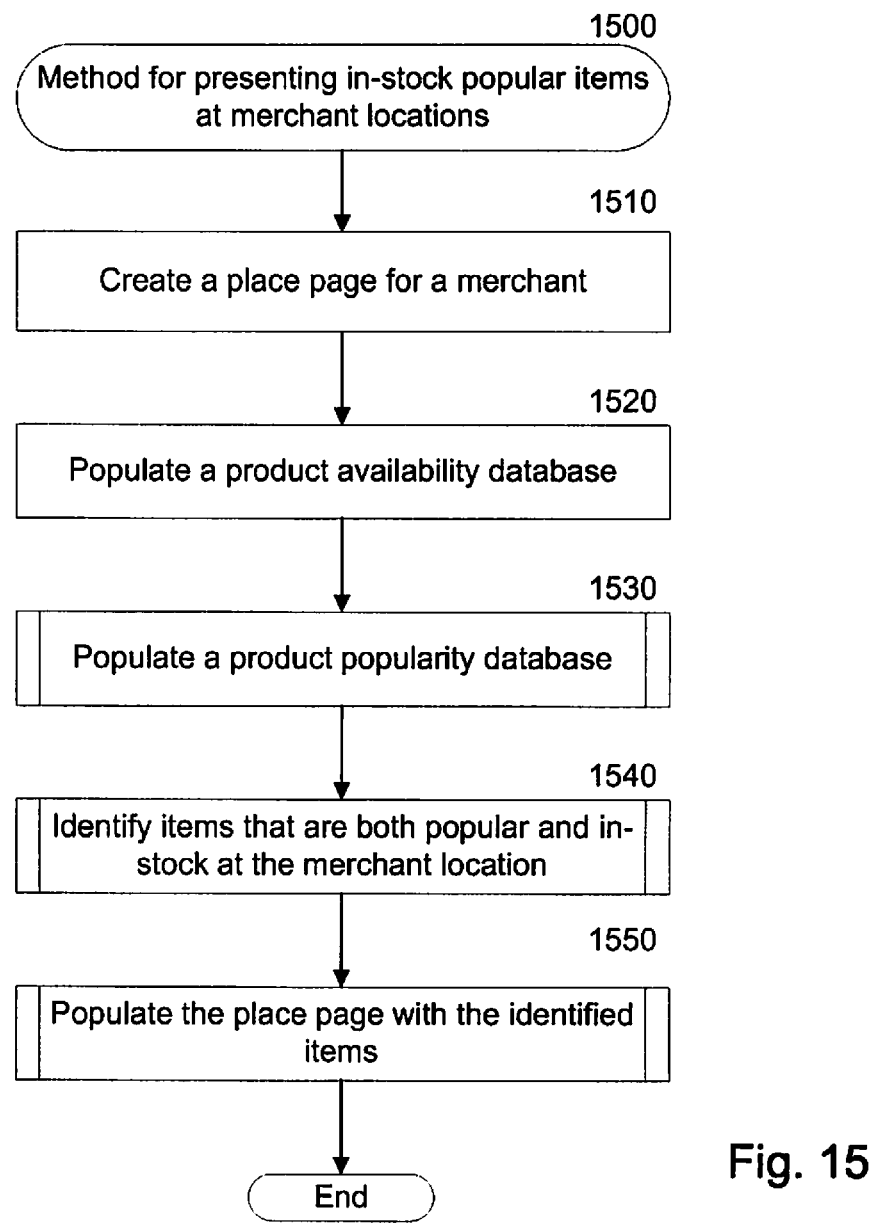
FIG. 15 is a block flow diagram depicting a method for displaying products on a place page, in accordance with certain exemplary embodiments.

FIG. 15 is a block flow diagram depicting a method 1500 for presenting in-stock, popular items that are available at merchant locations, in accordance with certain exemplary embodiments.

In block 1510, according to one embodiment, a merchant place page 1410 is created. The merchant place page 1410 may correspond to a particular store, by referencing the store's physical address, or by referencing the store's store number, or by some other type of identifier that allows for unique identification of the merchant's physical location. It shall be understood that the term "store" means a merchant's physical location. The place page 1410 is described in further detail hereinafter with respect to FIG. 19.

In block 1520, a product availability database 1470 is populated. The product availability can be obtained by the means described previously with respect to the product availability database 1470. Similarly, in block 1530, a product popularity database 1460 is populated and sorted, as described in further detail hereinafter with respect to FIG. 16.

In block 1540, a means for the identification of items that are both popular and in-stock at the merchant location is implemented according to the methods described in more detail hereinafter in FIG. 17. In block 1550, the place page 1410 is populated with one or more of the identified items that are both popular and available at the merchant location, as described in more detail hereinafter in FIGS. 18-19. The product availability may be noted with certain quantitative or qualitative signifiers such as, by way of non-limiting examples: limited availability, not available, available, in-stock, only "5" items left, and any other suitable notation indicating available inventory at the merchant location. The product availability database notes the product availability at each of a plurality of merchant locations. Thus, a product may be available at a merchant's location A but not at the merchant's location B.

Figure 16:
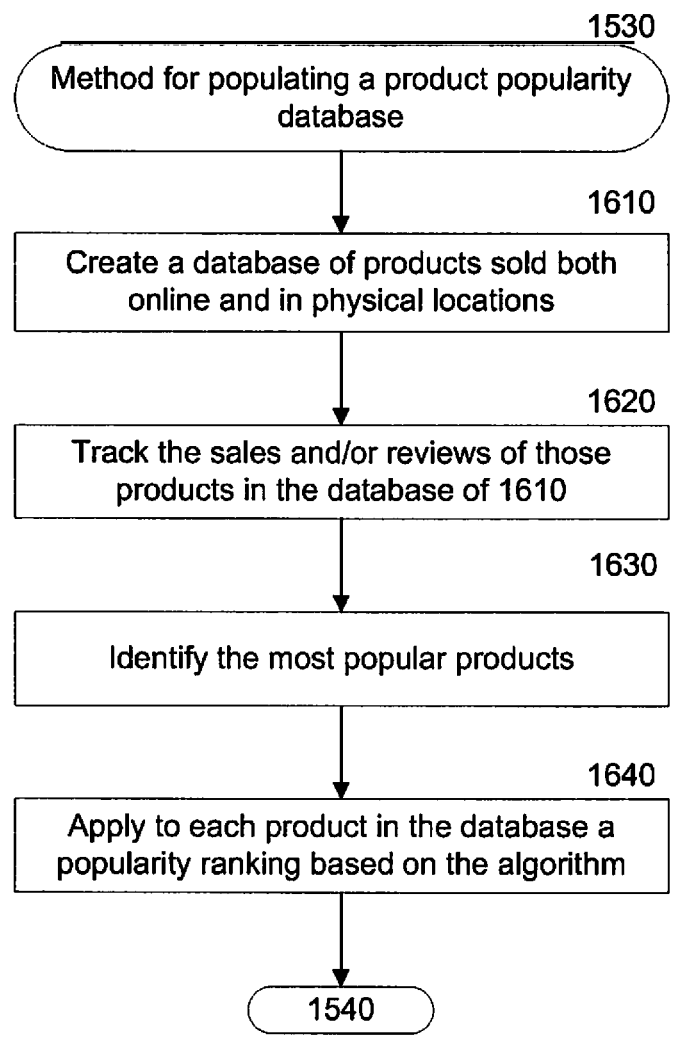
FIG. 16 is a block flow diagram depicting a method for populating a product popularity database, in accordance with certain exemplary embodiments.

FIG. 16 is a block flow diagram depicting a method 1530 for populating a product popularity database 1470, in accordance with certain exemplary embodiments. Exemplary steps described with reference to FIG. 16 may be performed by the popularity engine 1450.

Block 1610 depicts the creation of a database of products sold at various locations of one or more merchants, including without limitation products sold online and/or product sold in physical locations. The list of products can be generated by input from merchant servers 1480 and also by data servers 1490. The data server 1490 may take into account recent transactions over the Internet, typical search terms used in attempting to locate, read about, or purchase products over the Internet, manual or automatic entry of terms, or otherwise. For example, the various merchants may provide direct information through the merchant servers 1480. The information provided by the merchant may be dynamic, real-time information, or static, batch-processed information provided at certain time intervals. Alternatively, application of the methods described above with respect to FIGS. 1-13 may provide a list of products sold.

Block 1620 depicts the tracking of sales and/or reviews of the products in the database created by implementation of method step 1610. In one embodiment, data server 1490 may provide information regarding user product searches. This may be in the form of directed searches for products, or for reviews or information about certain products. In another embodiment, data server 1490 may provide information regarding actual purchase of products by users over the Internet or at certain physical locations. In another embodiment, data server 1490 may provide information regarding the relative frequency or use of certain product names in certain locations such as, for example, rating sites, review sites, discussion forums, or other locations. In yet another embodiment, merchant server 1480 may provide sales information. For example, the merchant may provide the number of units sold and the dollar amounts of the unit sold either overall, or at each location, or both. It is understood that this information may be obtained from a merchant server 1480, which may include a plurality of merchant servers, a data server 1490, which may include a plurality of data servers, or both. Additionally, sales information can be gathered or estimated using the systems and methods discussed previously with reference to FIGS. 1-13.

In block 1630, the most popular products are identified. In an exemplary embodiment, the most popular products can be identified based on the compiled sales, review, or frequency of use data as compiled by the method step depicted in block 1620. In another embodiment, the most popular products can be identified by taking into account the number of clicks or hovers on a product description or a product image or a hyperlink leading to further information or sales sites for a certain product or any other tool that allows the logging of consumer interest in a particular product. For purposes of this application, "click" means the affirmative selection of a field in an internet display or web page, and "hover" means the passive selection of a field in an internet display or web page, by way of, for example, the use of a computer peripheral device such as a mouse or a keyboard. As further explanation, a hover may include, for example, a mouse pointer that lingers over a hyperlink for an extended period of time. One or more of these factors, as well as other factors, can be considered and weighted accordingly depending on the desired outcome. For example, an algorithm can be used to take into account only one input, such as number of units sold, and assign a popularity ranking based only on the number of units sold. In such an embodiment, the most popular item would be the item with the highest number of units sold, the second most popular item would be the item with the second highest number of units sold, and so on. As another example, the algorithm may weight the number of units sold as a percentage of the ranking, and the price per unit sold as another percentage of the ranking. In such an embodiment, the combination of the two factors would result in a potentially different popularity ranking than would the application of just one factor, such as the number of units sold, alone. In other embodiments, each of the various factors collected could be applied alone or in conjunction with the other factors to derive a popularity ranking. The algorithm may be modified or adapted to achieve certain merchant goals in certain embodiments, such as focusing on certain types of products or certain product categories, or to maximize the number of units sold, or to maximize the sale of the most profitable items, or otherwise. Additionally, the products may be sorted into categories of products so that the most popular products in each category can be identified. Exemplary product categories include electronics, office, outdoor, home improvement, food, or any other suitable category of related products.

Block 1640 depicts the application to each product in the database 1460 a popularity ranking based on the method described previously with respect to step 1630. The application may be accomplished by assigning to each product in the database a number between 0 and 1 reflecting the relative popularity of the product. Alternatively, the application may be accomplished by assigning an integer, starting at 1 for the most popular product, 2 for the second most popular product, and so on. Any suitable ranking method may be employed.

The method then proceeds to step 1540 (FIG. 15).

Figure 17:
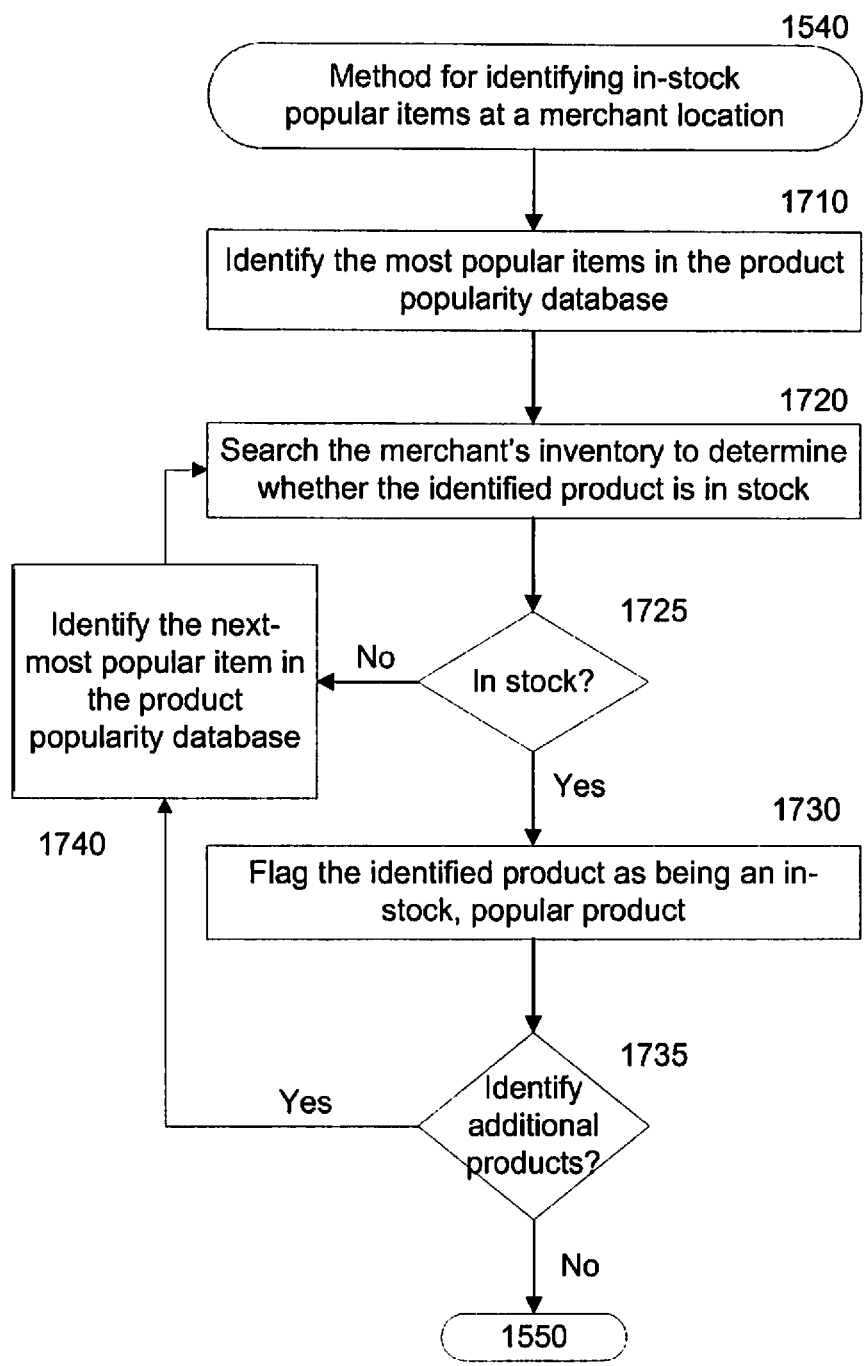
FIG. 17 is a block flow diagram depicting a method for identifying in-stock popular items at a merchant location, in accordance with certain exemplary embodiments.

FIG. 17 is a block flow diagram depicting a method 1540 for identifying in-stock popular items at a merchant location, in accordance with certain exemplary embodiments. Exemplary steps described with reference to FIG. 17 may be performed by the cross-reference engine 1440.

Block 1710 depicts the identification by the cross-reference engine 1440 of the most popular items in the product popularity database. This step can be performed by reference to the popularity assignment described previously with respect to block 1640, wherein each product may be assigned a number or other type of identifier showing the relative popularity of the item according to the applied method. The step depicted by block 1710 illustrates an embodiment where the most highly ranked item in the product popularity database 1460 is taken as the starting point for the iterative process. In other embodiments, a different starting point, such as the most popular product in a particular product category, may be chosen.

Block 1720 depicts the search of the merchant's inventory to determine whether the identified product is in stock. This step is accomplished by checking whether the product identified in the product popularity database 1460 is identified as available, in-stock, out-of stock, of limited availability, or otherwise in the product availability database 1470. Block 1725 depicts the determination whether a product is in-stock. If the product is in-stock (including limited availability), the next step, as depicted in step 1730, is to flag or otherwise note the identified product as being an in-stock, popular product. If the product is not in-stock, according to the identifier assigned to the product in the product availability database, the iterative process branches to step 1740, described hereinafter. After the product is flagged as depicted in block 1730, the method determines whether to identify additional products, as depicted in block 1735. If yes, the method branches to step 1740, described hereinafter. At least one but possibly more than one product may be identified. The method provides for means to customize the number of products identified; the iterative process described allows for the display of any desired number of products that are both popular and in-stock at the merchant location.

If a product is noted as out of-stock, as determined in the step depicted at block 1725, or if the merchant or other party desires to display an incremental item, as determined in the step depicted at block 1735, the method proceeds according to the step depicted by block 1740. In block 1740, the next-most popular item in the product popularity database 1460 is identified, and steps 1720-1735 are iteratively reapplied until all products have been flagged as out-of-stock or until the answer to the step depicted at block 1735 is no.

The method 1540 then proceeds to step 1550 (FIG. 15).

Figure 18:
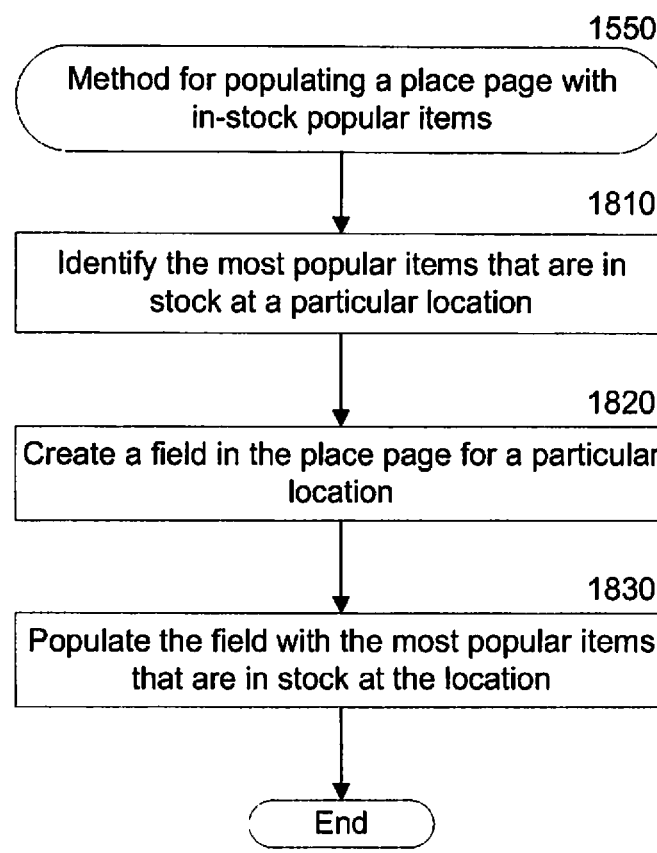
FIG. 18 is a block flow diagram depicting a method for populating a place page with in-stock popular items, in accordance with certain exemplary embodiments.

FIG. 18 is a block flow diagram depicting a method 1550 for populating a place page with in-stock, popular items, in accordance with certain exemplary embodiments. Exemplary steps described with reference to FIG. 18 may be performed by the cross-reference engine 1440.

Block 1810 depicts the identification of the most popular items that are in stock at a particular merchant location. This step can be accomplished by way of the steps outlined with respect to FIG. 17, as here applied to a specific merchant location, for example, the merchant store at 1234 $10^{th}$ Street.

Block 1820 depicts the creation of a field in the place page 1410 for a particular location. In one embodiment, the merchant store at, for example, 1234 $10^{th}$ Street may have a place page 1410, such as a web page, that is accessed by way of the Internet. Block 1820 depicts the creation of a field in that place page 1410 that can accommodate certain images, hyperlinks, text descriptions, or other means of conveying information to a user.

Block 1830 depicts the population of the field described previously with respect to block 1820 with the identified most popular items that are in stock at the location. In one embodiment, the five most popular items that are in-stock at the merchant location may be displayed on the merchant's place page 1410. The place page itself is described in more detail below with respect to FIG. 19.

Figure 19:
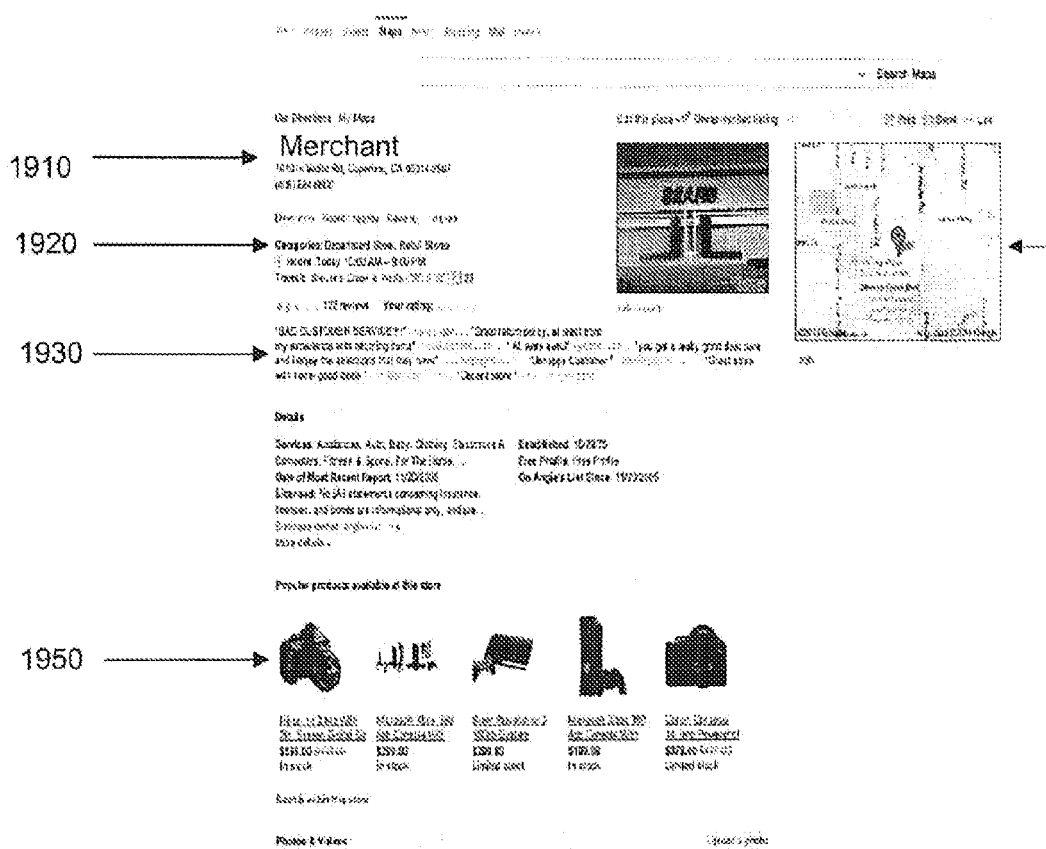
FIG. 19 is an exemplary place page displaying products, in accordance with certain exemplary embodiments.

FIG. 19 depicts a particular, exemplary embodiment of a place page 1900 for displaying certain information associated with a particular merchant location, in accordance with certain exemplary embodiments.

As depicted in FIG. 19, place page 1900 may comprise a merchant name and address 1910, hours and contact information 1920 associated with the particular merchant location 1910, customer reviews 1930 associated with the particular merchant location 1910, a graphical depiction of a map and/or directions 1940 to the particular merchant location 1910, and a list 1950 of the popular products that are available at the particular merchant location. Other information could be included in the place page, such as expert or editorial reviews, particular comments from other users including, for example, third party users flagged or identified or followed by the first party user viewing the place page, and so on.

In the embodiment depicted by FIG. 19, the popular products available at the merchant location are displayed in field 1950. Field 1950 may contain graphical representations, such as pictures, of the popular items, as shown. Field 1950 may also contain textual or audio recordings of the popular products, or other means of conveying information to a user. Field 1950 may contain one or more popular items. In certain embodiments, the field 1950 may convey additional information associated with the identified popular products, such as the price, links to consumer or expert reviews, and notes on the availability, such as in-stock, limited availability, only "5" remaining, and so on. In certain other embodiments, the field 1950 or another location on the place page 1900 may contain a link or a search box that allows a user to search the merchant's inventory available at the particular merchant location. This item may involve searching the specific merchant location associated with the place page, or, in another embodiment, this item may allow the user to search for inventory available at similar or nearby locations, allowing the user to identify stores that have the desired item in-stock.

The exemplary methods and systems described in the embodiments presented previously are illustrative, and, in alternative embodiments, certain components/steps can be performed in a different order, in parallel with one another, omitted entirely, and/or combined between different exemplary methods, and/or certain additional components/steps can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc. The systems and methods described herein can be implemented by one or more software modules operating in at least one computer system that comprises instructions stored in a machine-readable medium and a processor that executes the instructions.

Although specific embodiments of the invention have been described above in detail, the description is merely for purposes of illustration. Various modifications of, and equivalent blocks corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for presenting popular products that are in-stock at a merchant location, the method comprising the steps of:
  creating, by one or more computing devices, an electronic document for a merchant corresponding to a physical location of the merchant, the electronic document comprising information regarding the merchant's physical location;
  estimating, by the one or more computing devices, whether one or more products are in stock at the physical location of the merchant, wherein the estimating comprises, for each of the one or more products:
    receiving point of sale data, the point of sale data comprising a product identifier that identifies a product that was sold, a quantity of the product that was sold, a first store identifier that identifies the physical location of the merchant at which the product was sold, and a first timestamp corresponding to a first time (T1) at which the product was sold,
    determining based at least on the received point of sale data, a rate of sales ($r_s$) for the product at the physical location of the merchant,
    receiving, by the computer, an inventory snapshot, wherein the inventory snapshot reflects the inventory (Q) of the product at the store at a first time (T1), and wherein receipt of the inventory snapshot occurs at a second time (T2) subsequent to the first time,
    determining, by the computer, a probability that fewer than Q products were sold between times T1 and T2, wherein the probability is based at least on the rate of sales ($r_s$), the first time (T1), and the second time (T2), and
    determining, by the computer, an indication of product availability based at least on the probability, wherein the indication of product availability comprises an "in stock" indicator when the probability is greater than a first probability threshold, and the product availability indicator comprises an "out of stock" indicator when the probability is less than a second probability threshold,
  populating, by the one or more computing devices, a product availability database with product inventory that is in stock at the merchant's physical location based at least in part on the estimation that the one or more products are in stock;
  populating, by the one or more computing devices, a product popularity database with popular products by identifying a popularity of each product relative to at least one other product;
  comparing, by the one or more computing devices, information from the product popularity database with information from the product availability database to identify at least two products that are (1) identified as popular in the product popularity database relative to at least one other product and (2) estimated as in stock at the merchant's physical location as identified in the product availability database;
  populating, by the one or more computing devices, the electronic document with the at least two popular products that are estimated as in stock at the merchant's physical location; and
  presenting, by the one or more computing devices, the electronic document comprising the information regarding the merchant's physical location and the at least two popular products that are estimated as in stock at the merchant's physical location.

2. The method of claim 1, wherein identifying a popularity of each product relative to at least one other product is based on at least one of editorial product reviews, user reviews, consumer reviews, number of units sold, number of network searches for a product, or a combination of price per unit and number of units sold.

3. The method of claim 1, wherein the information regarding the merchant's physical location further comprises at least one of a physical address of the merchant's location and a map showing the merchant's location.

4. The method of claim 1, further comprising the step of providing a hyperlink that allows a user to search for products that are available at the merchant's physical location.

5. The method of claim 1, wherein populating the electronic document comprises presenting the top five most popular products that are estimated as in stock at the merchant's physical location.

6. The method of claim 1, wherein additional information related to the popular products is available, such information comprising at least one of user reviews, expert reviews, whether the at least one popular product is of limited availability, or whether availability of the at least one popular product is limited to a specified number of units.

7. The method of claim 1, wherein the product availability database and the product popularity database comprise a single database.

8. A system for providing popular products that are in-stock at a merchant location, comprising:
- a server that presents an electronic document that corresponds to a physical location of a merchant, the electronic document comprising an electronic document that presents information regarding the merchant;
- a product availability database comprising inventory that is available from the merchant at the physical location of the merchant, the product availability database identifying products that are estimated as in stock at the merchant at the merchant's physical location, wherein the identifying the products that are estimated as in stock comprises, for each of the products;
  - receiving point of sale data, the point of sale data comprising a product identifier that identifies a product that was sold, a quantity of the product that was sold, a first store identifier that identifies the physical location of the merchant at which the product was sold, and a first timestamp corresponding to a first time (T1) at which the product was sold,
  - determining based at least on the received point of sale data, a rate of sales events ($r_e$) for the product at the physical location of the merchant,
  - receiving, by the computer, an inventory snapshot, wherein the inventory snapshot reflects the inventory (Q) of the product at the store at a first time (T1), and wherein receipt of the inventory snapshot occurs at a second time (T2) subsequent to the first time,
  - determining, by the computer, a probability that fewer than Q products were sold between times T1 and T2, wherein the probability is based at least on the rate of sales ($r_s$), the first time (T1), and the second time (T2), and
  - determining, by the computer, an indication of product availability based at least on the probability, wherein the indication of product availability comprises an "in stock" indicator when the probability is greater than a first probability threshold, and the product availability indicator comprises an "out of stock" indicator when the probability is less than a second probability threshold;
- a product popularity database comprising an identification of products that are each ranked by popularity relative to at least one other product; and
- an analyzer that compares information from the product popularity database to identify at least two products that are identified as popular in the product popularity database relative to at least one other product and that are estimated as in stock at the merchant's physical location as identified in the product availability database,
- the server populating the electronic document with the information regarding the merchant's physical location and the at least two popular products that are estimated as in stock at the merchant's physical location.

9. The system of claim 8, wherein the analyzer identifies at least one popular product based on at least one of editorial product reviews, user reviews, consumer reviews, number of units sold, number of network searches for a product, or a combination of price per unit and number of units sold.

10. The system of claim 8, wherein information regarding the merchant's physical location comprises at least one of a physical address of the merchant's location and a map showing the merchant's address.

11. The system of claim 8, wherein the server further inserts into the electronic document a hyperlink that allows a user to search for products that are available at the merchant's physical location.

12. The system of claim 8, wherein the server inserts into the electronic document the at least two popular products by inserting the top five most popular products that are estimated as in stock at the merchant's physical.

13. The system of claim 8, wherein the server populating into the electronic document the at least two popular products comprises populating additional information related to the at least two popular products comprising at least one of user reviews, expert reviews, whether the at least one popular product is of limited availability, or whether availability of the at least one popular product is limited to a specified number of units.

14. The system of claim 8, wherein the product availability database and the product popularity database comprise a single database.

15. A computer-implemented method for presenting popular products that are in-stock at a merchant location, the method comprising the steps of:
- estimating, by one or more computing devices, whether one or more products are in stock at a physical location of a merchant, wherein the estimating comprises, for each of the one or more products:
  - receiving point of sale data, the point of sale data comprising a product identifier that identifies a product that was sold, a quantity of the product that was sold, a first store identifier that identifies the physical location of the merchant at which the product was sold, and a first timestamp corresponding to a first time (T1) at which the product was sold,
  - determining based at least on the received point of sale data, a rate of sales events ($r_e$) for the product at the physical location of the merchant,
  - receiving, by the computer, an inventory snapshot, wherein the inventory snapshot reflects the inventory (Q) of the product at the store at a first time (T1), and wherein receipt of the inventory snapshot occurs at a second time (T2) subsequent to the first time,
  - determining, by the computer, a probability that fewer than Q products were sold between times T1 and T2, wherein the probability is based at least on the rate of sales ($r_s$), the first time (T1), and the second time (T2), and
  - determining, by the computer, an indication of product availability based at least on the probability, wherein the indication of product availability comprises an "in stock" indicator when the probability is greater than a first probability threshold, and the product availability indicator comprises an "out of stock" indicator when the probability is less than a second probability threshold,
- identifying, by the one or more computing devices, products that are in stock at the physical location of the merchant based on the estimation that the one or more products are in stock;
- identifying, by the one or more computing devices, popular products;
- comparing, by the one or more computing devices, the estimated in stock products with the popular products to identify at least two products that are identified as popular and that are estimated as in stock at the merchant's physical location; and presenting, by the one or more computing devices, the at least two products that are identified as popular and that are estimated as in stock at a merchant's physical location.

16. The method of claim 15, wherein the identification of popular products is based on at least one of editorial product reviews, user reviews, consumer reviews, number of units sold, number of searches for a product, or a combination of price per unit and number of units sold.

17. The method of claim 15, further comprising presenting, with the popular products, a physical address of the merchant's location and a map showing the merchant's location.

18. The method of claim 15, further comprising presenting a hyperlink that allows a user to search for products that are available at the merchant's physical location.

19. The method of claim 15, wherein presenting the popular products comprises presenting the top five most popular products that are identified as in stock at the merchant's physical location.

20. The method of claim 15, wherein the presenting step further comprises presenting additional information related to the popular products comprising at least one of user reviews, expert reviews, whether the popular products are of limited availability, or whether availability of the popular products is limited to a specified number of units.

21. The method of claim 1, wherein the point of sale data comprises data from a source other than the store at which the product was sold.

22. The method of claim 1, further comprising storing $r_e$ and the timestamps in a data object corresponding to the product and the store.

23. The method of claim 1, wherein $(x=r_s \Delta T)$, $(\Delta T=T2-T1)$, $(N=Q-1)$, and the probability that fewer than Q products were sold between times T1 and T2 is determined according to an equation $$Pr(N, x) = e^{-x} \sum_{k=0}^{N} \frac{x^k}{k!}.$$

24. The method of claim 23, wherein k is in a range $0.03 \le k \le 0.1$.

25. The method of claim 23, wherein the first and second probability thresholds are the same threshold.

26. The method of claim 23, wherein the rate of sales ($r_s$) is determined according to an exponential moving average.

27. The method of claim 26, wherein the rate of sales ($r_s$) is determined by an equation <u>/<t>, where <u> is determined recursively as $$<u>_i = (1-j)*<u>_{i-1} + j*u_i,$$

and <t> is determined recursively as $$<t>_i = (1-k)*<t>_{i-1} + k*t_i,$$

such that $u_i$ is the number of units sold during sales event i, $t_i$ is a period of time between sales events i and i−1, j is a constant in a range 0<j<1, and k is a constant in a range 0<k<1.

28. The method of claim 27, wherein j is in a range $0.02 \le j \le 0.5$.

29. The method of claim 27, wherein j is in a range $0.03 \le k \le 0.1$.

30. The method of claim 27, wherein j and k are equal.

* * * * *